United States Patent
Sanderovich et al.

(10) Patent No.: US 10,278,078 B2
(45) Date of Patent: Apr. 30, 2019

(54) APPARATUS AND METHOD FOR REDUCING ADDRESS COLLISION IN SHORT SECTOR SWEEPS

(71) Applicant: QUALCOMM Incorporated, San Diego, CA (US)

(72) Inventors: Amichai Sanderovich, Atlit (IL); Alecsander Eitan, Haifa (IL); Assaf Yaakov Kasher, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 15/679,060

(22) Filed: Aug. 16, 2017

(65) Prior Publication Data
US 2018/0063723 A1    Mar. 1, 2018

Related U.S. Application Data

(60) Provisional application No. 62/382,766, filed on Sep. 1, 2016, provisional application No. 62/382,181, filed on Aug. 31, 2016.

(51) Int. Cl.
| | | |
|---|---|---|
| *H04W 4/00* | (2018.01) | |
| *H04W 16/28* | (2009.01) | |
| (Continued) | | |

(52) U.S. Cl.
CPC .............. *H04W 16/28* (2013.01); *H04B 7/06* (2013.01); *H04L 12/46* (2013.01);
(Continued)

(58) Field of Classification Search
CPC ... H04L 45/66; H04L 45/745; H04L 61/2046; H04L 12/46; H04L 12/4625; H04L 45/7453; H04W 16/28; H04B 7/06
(Continued)

(56) References Cited

U.S. PATENT DOCUMENTS

| | | | |
|---|---|---|---|
| 8,315,154 B2 | 11/2012 | Park | |
| 10,045,197 B1 * | 8/2018 | Abdallah | .............. H04W 8/005 |
| 2010/0164805 A1 | 7/2010 | Niu et al. | |
| 2011/0069688 A1 | 3/2011 | Zhang et al. | |
| (Continued) | | | |

FOREIGN PATENT DOCUMENTS

| | | |
|---|---|---|
| WO | WO-2012103381 A1 | 8/2012 |
| WO | WO-2017079518 A1 | 5/2017 |

OTHER PUBLICATIONS

International Search Report and Written Opinion—PCT/US2017/047444—ISA/EPO—dated Jan. 2, 2018.
(Continued)

*Primary Examiner* — Charles T Shedrick
(74) *Attorney, Agent, or Firm* — Steven R. Thiel; Loza & Loza

(57) ABSTRACT

Certain aspects of the present disclosure provide techniques to reduce address collision in short sector sweeps. In some cases, the techniques involve determining whether an encoded address (e.g., a compressed address), generated using a first parameter (e.g., a seed for a hash function), identifies a first wireless node and a second wireless node as a same destination for at least one first frame including the encoded address; generating at least one second frame including an indication not to use the first parameter if the encoded address identifies the first wireless node and the second wireless node as the same destination; and outputting the at least one second frame for transmission to at least one of the first wireless node or the second wireless node.

20 Claims, 18 Drawing Sheets

(51) Int. Cl.
*H04L 12/741* (2013.01)
*H04L 29/12* (2006.01)
*H04B 7/06* (2006.01)
*H04L 12/46* (2006.01)
*H04L 12/721* (2013.01)
*H04L 12/743* (2013.01)

(52) U.S. Cl.
CPC ........ *H04L 12/4625* (2013.01); *H04L 45/745* (2013.01); *H04L 61/2046* (2013.01); *H04L 45/66* (2013.01); *H04L 45/7453* (2013.01)

(58) Field of Classification Search
USPC ........................................................ 370/328
See application file for complete search history.

(56) References Cited

U.S. PATENT DOCUMENTS

| | | | |
|---|---|---|---|
| 2013/0022032 A1 | 1/2013 | Taghavi et al. | |
| 2014/0092779 A1* | 4/2014 | Seok | H04L 61/6068 370/254 |
| 2015/0078384 A1* | 3/2015 | Jackson | H04L 45/748 370/392 |
| 2015/0288427 A1 | 10/2015 | Wang et al. | |
| 2016/0255660 A1* | 9/2016 | Son | H04B 7/0491 370/329 |
| 2016/0277088 A1 | 9/2016 | Jo et al. | |
| 2017/0126302 A1 | 5/2017 | Sanderovich et al. | |
| 2017/0134076 A1 | 5/2017 | Maamari et al. | |
| 2017/0352954 A1* | 12/2017 | Abdallah | H04B 7/088 |
| 2017/0353984 A1* | 12/2017 | Abdallah | H04B 7/0617 |
| 2018/0063723 A1* | 3/2018 | Sanderovich | H04L 12/4625 |

OTHER PUBLICATIONS

Nitsche T., et al., "IEEE 802.11ad: Directional 60 GHz corrmunication for multi-Gigabit-per-second Wi- Fi [Invited Paper]", IEEE Communications Magazine, IEEE Service Center, Piscataway, us. vol. 52. No. 12, Dec. 1, 2014 (Dec. 1, 2014), XP011567636, pp. 132-141.

"ISO/IEC/IEEE International Standard for Information Technology—Telecommunications and Information Exchange between Systems—Local and Metropolitan Area Networks—Specific Requirements—Part 11: Wireless LAN Medium Access Control (MAC) and Physical Layer (PHY) Specifications", Amendment 3: Enhancement for Very High Throughput in the 60 GHz Band ( Adoption of IEEE Std 802.11ad—2012), IEEE Standard, IEEE, Piscataway, NJ, USA, Mar. 14, 2014, pp. 1-634, XP068070330.

* cited by examiner (CONVENTIONAL SECTOR SWEEP FRAME FORMAT)

APPARATUS AND METHOD FOR REDUCING ADDRESS COLLISION IN SHORT SECTOR SWEEPS

CROSS REFERENCE TO RELATED APPLICATIONS

This application claims priority under 35 U.S.C. § 119(e) to U.S. Provisional Application Nos. 62/382,766 filed Sep. 1, 2016, and 62/382,181 filed Aug. 31, 2016, both entitled "APPARATUS AND METHOD FOR REDUCING ADDRESS COLLISION IN SHORT SECTOR SWEEPS." The disclosure of the prior applications are considered part of this application, and are hereby incorporated by reference.

TECHNICAL FIELD

This disclosure relates generally to wireless communications systems and, more particularly, an apparatus and method for reducing address collision in short sector sweeps.

BACKGROUND

The 60 GHz band is an unlicensed band which features a large amount of bandwidth and a large worldwide overlap. The large bandwidth means that a very high volume of information can be transmitted wirelessly. As a result, multiple applications, each requiring transmission of large amounts of data, can be developed to allow wireless communication around the 60 GHz band. Examples for such applications include, but are not limited to, game controllers, mobile interactive devices, wireless high definition TV (HDTV), wireless docking stations, wireless Gigabit Ethernet, and many others.

In order to facilitate such applications there is a need to develop integrated circuits (ICs) such as amplifiers, mixers, radio frequency (RF) analog circuits, and active antennas that operate in the 60 GHz frequency range. An RF system typically includes active and passive modules. The active modules (e.g., a phased array antenna) require control and power signals for their operation, which are not required by passive modules (e.g., filters). The various modules are fabricated and packaged as radio frequency integrated circuits (RFICs) that can be assembled on a printed circuit board (PCB). The size of the RFIC package may range from several to a few hundred square millimeters.

In the consumer electronics market, the design of electronic devices, and thus the design of RF modules integrated therein, should meet the constraints of minimum cost, size, power consumption, and weight. The design of the RF modules should also take into consideration the current assembled configuration of electronic devices, and particularly handheld devices, such as laptop and tablet computers, in order to enable efficient transmission and reception of millimeter wave signals. Furthermore, the design of the RF module should account for minimal power loss of receive and transmit RF signals and for maximum radio coverage.

Operations in the 60 GHz band allow the use of smaller antennas as compared to lower frequencies. However, as compared to operating in lower frequencies, radio waves around the 60 GHz band have high atmospheric attenuation and are subject to higher levels of absorption by atmospheric gases, rain, objects, etc., resulting in higher free space loss. The higher free space loss can be compensated for by using many small antennas, for example arranged in a phased array.

Multiple antennas may be coordinated to form a coherent beam traveling in a desired direction. An electrical field may be rotated to change this direction. The resulting transmission is polarized based on the electrical field. A receiver may also include antennas which can adapt to match or adapt to changing transmission polarity.

SUMMARY

Certain aspects of the present disclosure provide an apparatus for wireless communications. The apparatus includes a processing system configured to determine whether an encoded address, generated using at least a first parameter, identifies a first wireless node and a second wireless node as a same destination for at least one first frame including the encoded address, and generate at least one second frame including an indication not to use the first parameter if the encoded address identifies the first wireless node and the second wireless node as the same destination; and an interface configured to output the at least one second frame for transmission to at least one of the first wireless node or the second wireless node.

Certain aspects of the present disclosure provide a method for wireless communications. The method includes determining whether an encoded address, generated using at least a first parameter, identifies a first wireless node and a second wireless node as a same destination for at least one first frame including the encoded address; generating at least one second frame including an indication not to use the first parameter if the encoded address identifies the first wireless node and the second wireless node as the same destination; and outputting the at least one second frame for transmission to at least one of the first wireless node or the second wireless node.

Certain aspects of the present disclosure provide an apparatus for wireless communications. The apparatus means for determining whether an encoded address, generated using at least a first parameter, identifies a first wireless node and a second wireless node as a same destination for at least one first frame including the encoded address; means for generating at least one second frame including an indication not to use the first parameter if the encoded address identifies the first wireless node and the second wireless node as the same destination; and means for outputting the at least one second frame for transmission to at least one of the first wireless node or the second wireless node.

Certain aspects of the present disclosure provide a computer readable medium having instructions stored thereon for determining whether an encoded address, generated using at least a first parameter, identifies a first wireless node and a second wireless node as a same destination for at least one first frame including the encoded address; generating at least one second frame including an indication not to use the first parameter if the encoded address identifies the first wireless node and the second wireless node as the same destination; and outputting the at least one second frame for transmission to at least one of the first wireless node or the second wireless node.

Certain aspects of the present disclosure provide a wireless node. The wireless node a processing system configured to determine whether an encoded address, generated using at least a first parameter, identifies a first wireless node and a second wireless node as a same destination for at least one first frame including the encoded address; and generate at least one second frame including an indication not to use the first parameter if the encoded address identifies the first wireless node and the second wireless node as the same destination; and a transmitter configured to transmit the at least one second frame to at least one of the first wireless node or the second wireless node.

Certain aspects of the present disclosure also provide various other apparatus, methods, and computer readable medium for performing the operations described herein.

DETAILED DESCRIPTION

Figure 1:
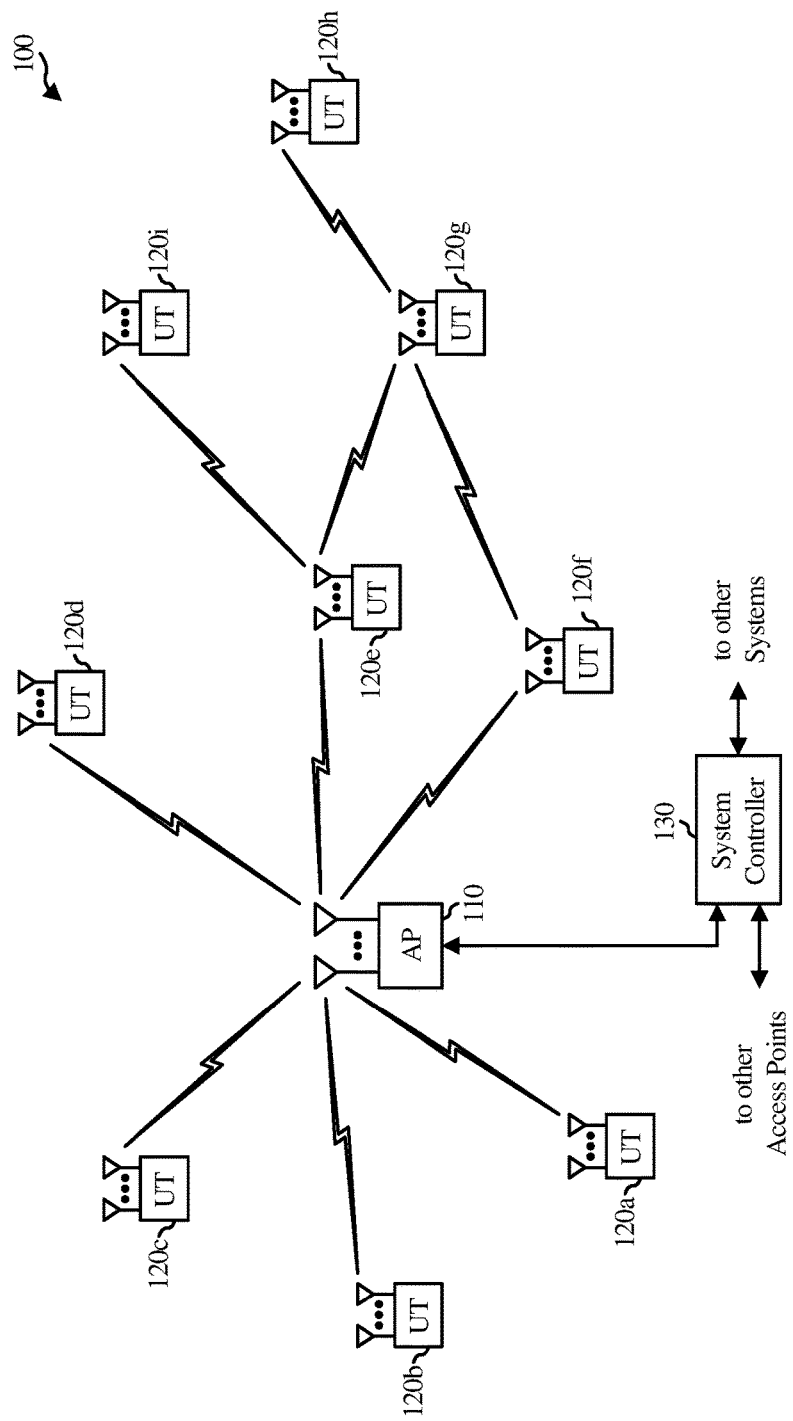
FIG. 1 illustrates a diagram of an example wireless communications network, in accordance with certain aspects of the present disclosure.

Aspects of the present disclosure may help reduce time during sector sweep procedures. By reducing the length of sector sweep frames, for example, by compressing or removing one or more fields, transmission time of each sector sweep frame may be reduced. As multiple sector sweep frames are typically transmitted in a sector sweep procedure, the reductions are compounded. Given that a station may perform a sector sweep procedure with several hundred stations, reducing transmission time of each frame by even micro-seconds, may result in an overall reduction of several milliseconds.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. For example, the transmission protocols may include institute of electrical and electronic engineers (IEEE) 802.11 protocol. In some aspects, the 802.11 protocol may include the 802.11ay protocol and future protocols. The detailed description and drawings are merely illustrative of the disclosure rather than limiting, the scope of the disclosure being defined by the appended claims and equivalents thereof.

An Example Wireless Communication System

The techniques described herein may be used for various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to simultaneously transmit data belonging to multiple user terminals. A TDMA system may allow multiple user terminals to share the same frequency channel by dividing the transmission signal into different time slots, each time slot being assigned to different user terminal. An OFDMA system utilizes orthogonal frequency division multiplexing (OFDM), which is a modulation technique that partitions the overall system bandwidth into multiple orthogonal sub-carriers. These sub-carriers may also be called tones, bins, etc. With OFDM, each sub-carrier may be independently modulated with data. An SC-FDMA system may utilize interleaved FDMA (IFDMA) to transmit on sub-carriers that are distributed across the system bandwidth, localized FDMA (LFDMA) to transmit on a block of adjacent sub-carriers, or enhanced FDMA (EFDMA) to transmit on multiple blocks of adjacent sub-carriers. In general, modulation symbols are sent in the frequency domain with OFDM and in the time domain with SC-FDMA. Frequency offset for OFDM is also contemplated.

The teachings herein may be incorporated into (e.g., implemented within or performed by) a variety of wired or wireless apparatuses (e.g., nodes). In some aspects, a wireless node implemented in accordance with the teachings herein may include an access point or an access terminal.

The AP 110 may include, be implemented as, or known as a Node B, Radio Network Controller (RNC), evolved Node B (eNB), Base Station Controller (BSC), Base Transceiver Station (BTS), Base Station (BS), Transceiver Function (TF), Radio Router, Radio Transceiver, Basic Service Set (BSS), Extended Service Set (ESS), Radio Base Station (RBS), or some other terminology.

An access terminal (AT) may include, be implemented as, or known as a subscriber station, a subscriber unit, a mobile station (MS), a remote station, a remote terminal, a user terminal (UT), a user agent, a user device, user equipment (UE), a user station, or some other terminology. In some implementations, an access terminal may include a cellular telephone, a cordless telephone, a Session Initiation Protocol (SIP) phone, a wireless local loop (WLL) station, a personal digital assistant (PDA), a handheld device having wireless connection capability, a Station (STA), or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless or wired medium. In some aspects, the node is a wireless node. Such wireless node may provide, for example, connectivity for or to a network (e.g., a wide area network such as the Internet or a cellular network) via a wired or wireless communication link.

FIG. 1 illustrates a multiple-access multiple-input multiple-output (MIMO) system 100 with access points and user terminals in which aspects of the present disclosure may be practiced.

For example, access point 110 or user terminals 120 may generate frames for transmission during a sector sweep procedure utilizing techniques described herein. In some cases, user terminals may be game controllers or the like, and the techniques may be applied to generate frames for transmission during a sector sweep procedure of the game controllers to a game station (acting as an access point).

For simplicity, only one access point 110 is shown in FIG. 1. The access point 110 is generally a fixed station that communicates with the user terminals 120 and may also be referred to as a base station or some other terminology. A user terminal 120 may be fixed or mobile and may also be referred to as a mobile station, a wireless device, or some other terminology. The access point 110 may communicate with one or more user terminals 120 at any given moment on the downlink and uplink. The downlink (i.e., forward link) is the communication link from the access point 110 to the user terminals 120, and the uplink (i.e., reverse link) is the communication link from the user terminals to the access point 110. A user terminal may also communicate peer-to-peer with another user terminal. A system controller 130 couples to and provides coordination and control for the access point 110.

While portions of the following disclosure will describe user terminals 120 capable of communicating via Spatial Division Multiple Access (SDMA), for certain aspects, the user terminals 120 may also include some user terminals that do not support SDMA. Thus, for such aspects, an AP 110 may be configured to communicate with both SDMA and non-SDMA user terminals. This approach may conveniently allow older versions of user terminals ("legacy" stations) to remain deployed in an enterprise, extending their useful lifetime, while allowing newer SDMA user terminals to be introduced as deemed appropriate.

In one example, the system 100 utilizes direct sequence spread spectrum (DSSS) modulation techniques in communication between the access point 110 and user terminals 120. The use of spread spectrum techniques allows for the system to readily manage and operate longer inter symbol interference (ISI) channels. In particular, code division multiple access (CDMA), readily facilitates increases in user capacity in systems of this size as compared to conventional cellular systems. More specifically, the access point 110 may be within a predefined geographical region, or cell, using several modulator-demodulator units or spread-spectrum modems to process communication signals. During typical operations, a modem in the access point 110 is assigned to each user terminal 120 as needed to accommodate transfer of communication signals. If the modem employs multiple receivers, then one modem accommodates diversity processing, otherwise multiple modems may be used in combination.

The system 100 employs multiple transmit and multiple receive antennas for data transmission on the downlink and uplink. The access point 110 is equipped with $N_{ap}$ $N_{ap}$ antennas and represents the multiple-input (MI) for downlink transmissions and the multiple-output (MO) for uplink transmissions. A set of K selected user terminals 120 collectively represents the multiple-output for downlink transmissions and the multiple-input for uplink transmissions. For pure SDMA, it is desired to have $N_{ap} \geq K \geq 1$ if the data symbol streams for the K user terminals are not multiplexed in code, frequency or time by some means. K may be greater than $N_{ap}$ if the data symbol streams can be multiplexed using TDMA technique, different code channels with CDMA, disjoint sets of sub-bands with OFDM, and so on. Each selected user terminal transmits user-specific data to and/or receives user-specific data from the access point 110. In general, each selected user terminal may be equipped with one or multiple antennas (i.e., $N_{ut} \geq 1$). The K selected user terminals can have the same or different number of antennas.

The SDMA system may be a time division duplex (TDD) system or a frequency division duplex (FDD) system. For a TDD system, the downlink and uplink share the same frequency band. For an FDD system, the downlink and uplink use different frequency bands. The MIMO system 100 may also utilize a single carrier or multiple carriers for transmission. Each user terminal may be equipped with a single antenna (e.g., in order to keep costs down) or multiple antennas (e.g., where the additional cost can be supported). The system 100 may also be a TDMA system if the user terminals 120 share the same frequency channel by dividing transmission/reception into different time slots, each time slot being assigned to different user terminal 120.

Figure 2:
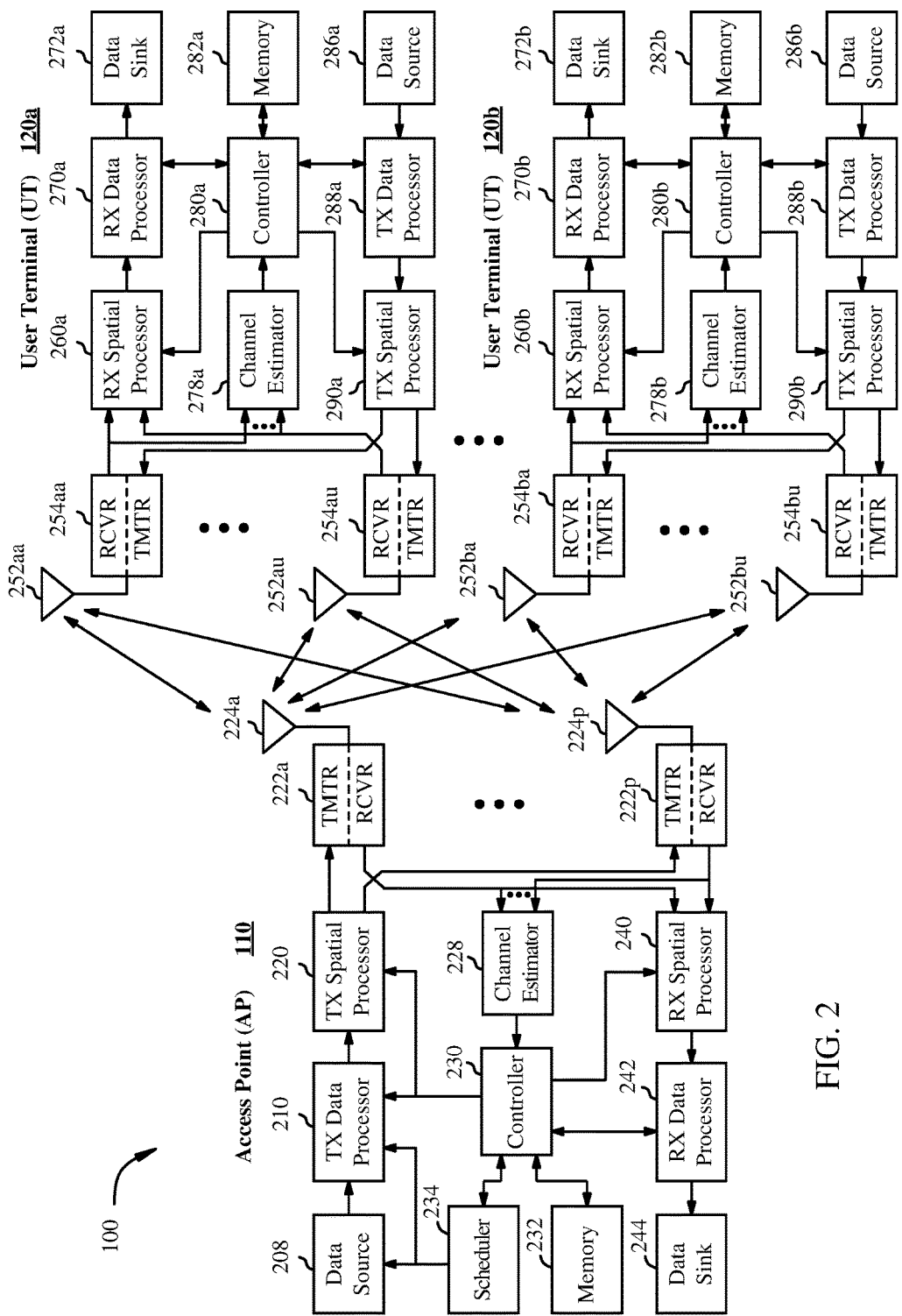
FIG. 2 illustrates a block diagram of an example access point and user terminals, in accordance with certain aspects of the present disclosure.

FIG. 2 illustrates a block diagram of the access point 110 and two user terminals (120a and 120b), in the MIMO system 100 in which aspects of the present disclosure may be practiced. The access point 110 is equipped with $N_{ap}$ antennas (224a through 224p). User terminal 120a is equipped with $N_{ut,a}$ antennas (252aa through 252au), and user terminal 120b is equipped with $N_{ut,b}$ antennas (252ba through 252bu). The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a wireless channel, and a "receiving entity" is an independently operated apparatus or device capable of receiving data via a wireless channel. In the following description, the subscript "dn" denotes the downlink, the subscript "up" denotes the uplink, $N_{up}$ user terminals are selected for simultaneous transmission on the uplink, $N_{dn}$ user terminals are selected for simultaneous transmission on the downlink, $N_{up}$ may or may not be equal to $N_{dn}$, and $N_{up}$ and $N_{dn}$ may be static values or can change for each scheduling interval. The beam-steering or some other spatial processing technique may be used at the access point 110 and user terminal 120.

On the uplink, at each user terminal 120 selected for uplink transmission, a transmit (TX) data processor 288 receives traffic data from a data source 286 and control data from a controller 280. The TX data processor 288 processes (e.g., encodes, interleaves, and modulates) the traffic data for the user terminal based on the coding and modulation schemes associated with the rate selected for the user terminal and provides a data symbol stream. A TX spatial processor 290 performs spatial processing on the data symbol stream and provides $N_{ut}$ transmit symbol streams for the $N_{ut}$ antennas. Each transmitter unit (TMTR) 254 receives and processes (e.g., converts to analog, amplifies, filters, and frequency upconverts) a respective transmit symbol stream to generate an uplink signal. The $N_{ut,a}$ transmitter unit(s) (254aa through 254au) provide $N_{ut,a}$ uplink signals for transmission from the $N_{ut,a}$ antenna(s) (252aa through 252au) to the access point 110. Similarly, the $N_{ut,b}$ transmitter unit(s) (254ba through 254bu) provide $N_{ut,b}$ uplink signals for transmission from the $N_{ut,b}$ antenna(s) (252ba through 252bu) to the access point 110.

The $N_{up}$ user terminals may be scheduled for simultaneous transmission on the uplink. Each of these user terminals performs spatial processing on its data symbol stream and transmits its set of transmit symbol streams on the uplink to the access point 110. The basis of scheduling may include AP based service period scheduling. The service period scheduling may include entering an awake state, configuring a service period for transceiving the AP and data, transceiving the AP and the data during the service period, and entering a doze state when the service period ends. The service period may be initiated by the AT sending service period start request frame that includes a duration field indicating a duration of one or more service periods.

At access point 110, the $N_{ap}$ antennas (224a through 224p) receive the uplink signals from all $N_{up}$ user terminals transmitting on the uplink. Each antenna (224a through 224p) provides a received signal to a respective receiver unit (RCVR) 222. Each of the receiver units (222a through 222p) performs processing complementary to that performed by the transmitters unit(s) (254ba through 254bu) and provides a received symbol stream. A receive (RX) spatial processor 240 performs receiver spatial processing on the $N_{ap}$ received symbol streams from the $N_{ap}$ receiver units (222a through 222p) and provides $N_{up}$ recovered uplink data symbol streams. The receiver spatial processing is performed in accordance with the channel correlation matrix inversion (CCMI), minimum mean square error (MMSE), soft interference cancellation (SIC), or some other technique. Each recovered uplink data symbol stream is an estimate of a data symbol stream transmitted by a respective user terminal. An RX data processor 242 processes (e.g., demodulates, deinterleaves, and decodes) each recovered uplink data symbol stream in accordance with the rate used for that stream to obtain decoded data. The decoded data for each user terminal may be provided to a data sink 244 for storage and/or a controller 230 for further processing.

On the downlink, at access point 110, a TX data processor 210 receives traffic data from a data source 208 for the $N_{dn}$ user terminals scheduled for downlink transmission, control data from the controller 230, and possibly other data from a scheduler 234. The various types of data may be sent on different transport channels. The TX data processor 210 processes (e.g., encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing (such as a precoding or beamforming, as described in the present disclosure) on the $N_{dn}$ downlink data symbol streams, and provides $N_{ap}$ transmit symbol streams for the $N_{ap}$ antennas. Each transmitter unit 222 receives and processes a respective transmit symbol stream to generate a downlink signal. The $N_{ap}$ transmitter units 222 provide $N_{ap}$ downlink signals for transmission from the $N_{ap}$ antennas 224 to the user terminals.

At each user terminal 120, the $N_{ut}$ antennas 252 receive the $N_{ap}$ downlink signals from access point 110. Each receiver unit 254 processes a received signal from an associated antenna 252 and provides a received symbol stream. An RX spatial processor 260 performs receiver spatial processing on $N_{ut}$ received symbol streams from the $N_{ut}$ receiver units 254 and provides a recovered downlink data symbol stream for the user terminal. The receiver spatial processing is performed in accordance with the CCMI, MMSE or some other technique. An RX data processor 270 processes (e.g., demodulates, de-interleaves and decodes) the recovered downlink data symbol stream to obtain decoded data for the user terminal.

At each user terminal 120, a channel estimator 278 estimates the downlink channel response and provides downlink channel estimates, which may include channel gain estimates, signal-to-noise ratio (SNR) estimates, noise variance and so on. Similarly, a channel estimator 228 estimates the uplink channel response and provides uplink channel estimates. The controller 280 for each user terminal typically derives the spatial filter matrix for the user terminal based on the downlink channel response matrix $H_{dn}$ for that user terminal. The controller 230 derives the spatial filter matrix for the access point 110 based on the effective uplink channel response matrix $H_{up,eff}$. The controller 280 for each user terminal may send feedback information (e.g., the downlink and/or uplink eigenvectors, eigenvalues, SNR estimates, and so on) to the access point 110. The controllers 230 and 280 also control the operation of various processing units at access point 110 and the user terminal 120, respectively.

According to certain aspects of the present disclosure, the various processors shown in FIG. 2 may direct the operation at the AP 110 and/or the user terminal 120, respectively, to perform various techniques described herein.

Figure 3:
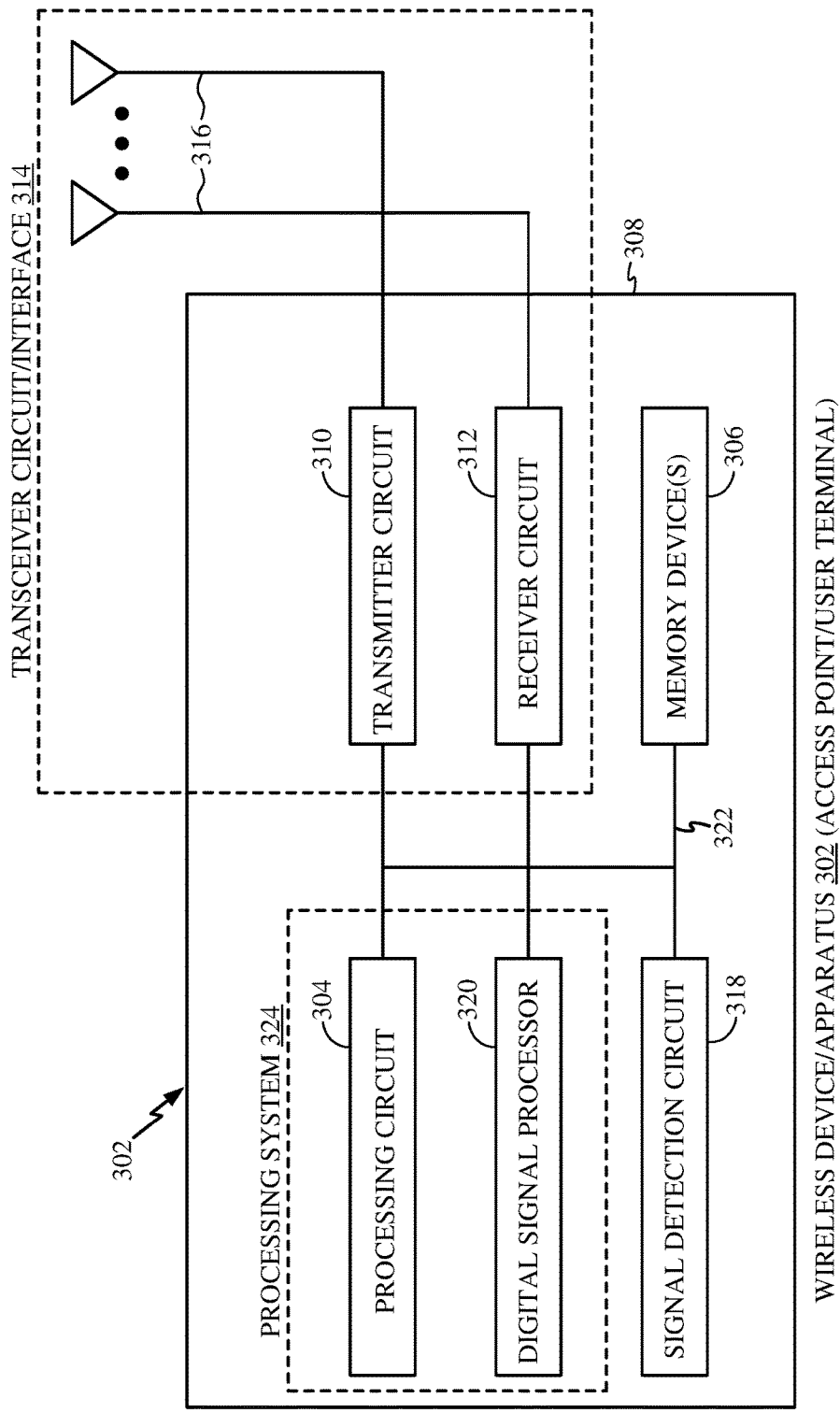
FIG. 3 illustrates a block diagram of an example wireless device, in accordance with certain aspects of the present disclosure.

FIG. 3 illustrates various components that may be utilized in a wireless device 302 in which aspects of the present disclosure may be practiced and that may be employed within the MIMO system 100. The wireless device 302 is an example of a device that may be configured to implement the various methods described herein. The wireless device 302 may be an access point 110 or a user terminal 120.

The wireless device 302 may include a processing system 324 containing a processing circuit 304, or processor, which controls operation of the wireless device 302, and a digital signal processor (DSP) 320 for use in processing signals. The processing circuit 304 may also be referred to as a central processing unit (CPU). The memory device(s) 306, which may include both read-only memory (ROM) and random access memory (RAM), provides instructions and data to the processing circuit 304. A portion of the memory device(s) 306 may also include non-volatile random access memory (NVRAM). The processing circuit 304 typically performs logical and arithmetic operations based on program instructions stored within the memory device(s) 306. The instructions in the memory device(s) 306 may be executable to implement the methods described herein. The processing circuit 304 may, for example, perform or direct operations 700 in FIG. 7 to generate frames for transmission during a sector sweep procedure and/or other processes for the techniques described herein and/or may perform or direct operations 900 in FIG. 9 to process such frames during a sector sweep procedure.

The wireless device 302 may also include a housing 308 that may include a transmitter circuit 310 and a receiver circuit 312 (or simply, transmitter and receiver) to allow transmission and reception of data between the wireless device 302 and a remote location. The transmitter circuit 310 and the receiver circuit 312 may be combined into a transceiver circuit 314. A single or a plurality of transmit antennas 316 may be attached to the housing 308 and electrically coupled to the transmitter circuit 310 and/or receiver circuit 312 to form the transceiver circuit 314. The wireless device 302 may also include (not shown) multiple transmitters, multiple receivers, and multiple transceivers. The transceiver circuit 314 and the single or the plurality of the transmit antennas 316 may be referred to herein as a radio frequency (RF) front end, or simply as an interface.

The wireless device 302 may also include a signal detection circuit 318, or signal detector, that may be used in an effort to detect and quantify the level of signals received by the transceiver circuit 314. The signal detection circuit 318 may detect such signals as total energy, energy per subcarrier per symbol, power spectral density and other signals.

The various components of the wireless device 302 may be coupled together by a bus system 322 which may include a power bus, a control signal bus, and a status signal bus in addition to a data bus. The bus system 322 may be referred to herein as a bus interface, or simply as the interface. In some cases, the bus system 322 may output data for transmission. For example, the processing system 324 may output data, via the bus system 322, to the transceiver circuit 314 for transmission. Similarly, rather than actually receiving data, the bus system 322 may operate to obtain a frame received from another device. For example, a processor may obtain (or receive) a frame, via the bus system 322, from the transceiver circuit 314 and the antenna 316.

A beamforming process may solve one of the problems for communication at the millimeter-wave spectrum, which is its high path loss. As such, as shown in FIG. 2, a large number of antennas are place at each transceiver to exploit the beamforming gain for extending communication range. That is, the same signal is sent from each antenna in an array, but at slightly different times.

According to an exemplary embodiment, the BF process includes a sector level sweep (SLS) phase and a beam refinement stage. In the SLS phase, one of the wireless nodes acts as an initiator by conducting an initiator sector sweep, which is followed by a transmit sector sweep by the responding station (where the responding station conducts a responder sector sweep). A sector is either a transmit antenna pattern or a receive antenna pattern corresponding to a sector ID. As mentioned above, a station may be a transceiver that includes one or more active antennas in an antenna array (e.g., a phased antenna array).

The SLS phase typically concludes after an initiating station receives sector sweep feedback and sends a sector acknowledgement (ACK), thereby establishing BF. Each transceiver of the initiator station and of the responding station is configured for conducting a receiver sector sweep (RXSS) reception of sector sweep (SSW) frames via different sectors, in which a sweep is performed between consecutive receptions and a transmission of multiple sector sweeps (SSW) (TXSS) or directional Multi-gigabit (DMG) beacon frames via different sectors, in which a sweep is performed between consecutive transmissions.

During the beam refinement phase, each station can sweep a sequence of transmissions, separated by a short beamforming inter-frame space (SBIFS) interval, in which the antenna configuration at the transmitter or receiver can be changed between transmissions. In other words, beam refinement is a process where a station can improve its antenna configuration (or antenna weight vector) both for transmission and reception. That is, each antenna includes an antenna weight vector (AWV), which further includes a vector of weights describing the excitation (amplitude and phase) for each element of an antenna array.

Figure 4:
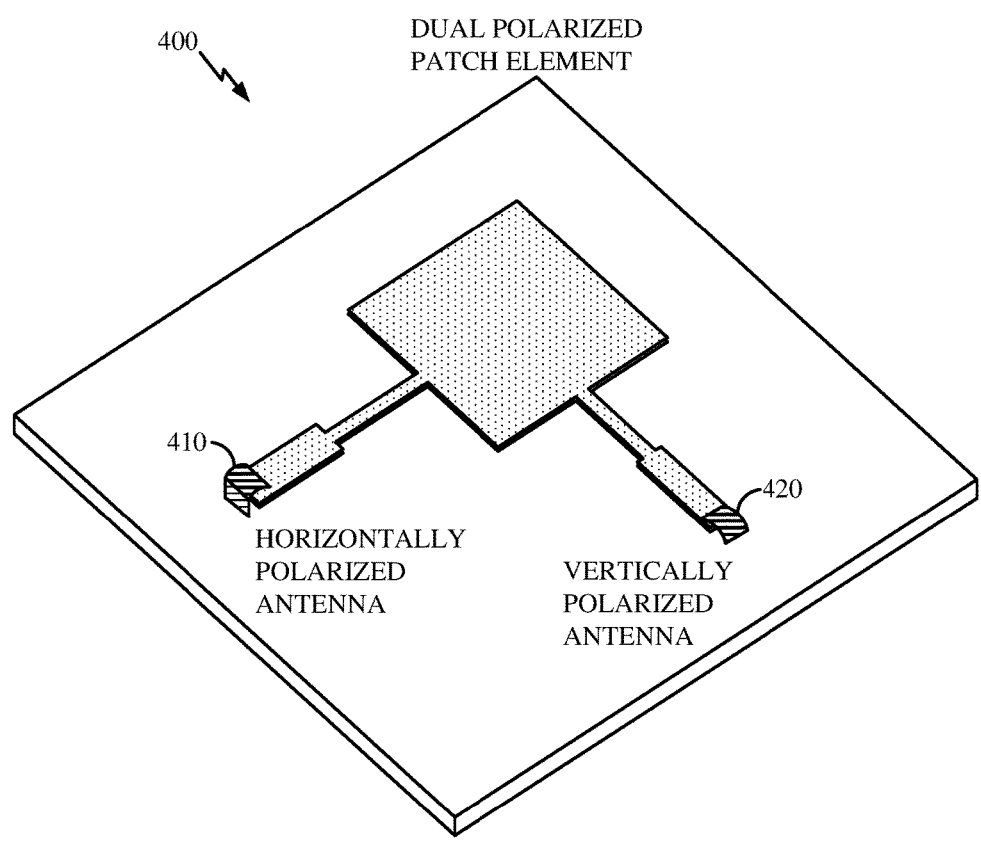
FIG. 4 illustrates an example dual polarized patch element, in accordance with certain aspects of the present disclosure.

FIG. 4 illustrates an example dual polarized patch element 400 which may be employed, in accordance with certain aspects of the present disclosure. As shown in FIG. 4, a single element of an antenna array may contain multiple polarized antennas. Multiple elements may be combined together to form an antenna array. The polarized antennas may be radially spaced. For example, as shown in FIG. 4, two polarized antennas may be arranged perpendicularly, corresponding to a horizontally polarized antenna 410 and a vertically polarized antenna 420. Alternatively, any number of polarized antennas may be used. Alternatively or in addition, one or both antennas of an element may also be circularly polarized.

Figure 5:
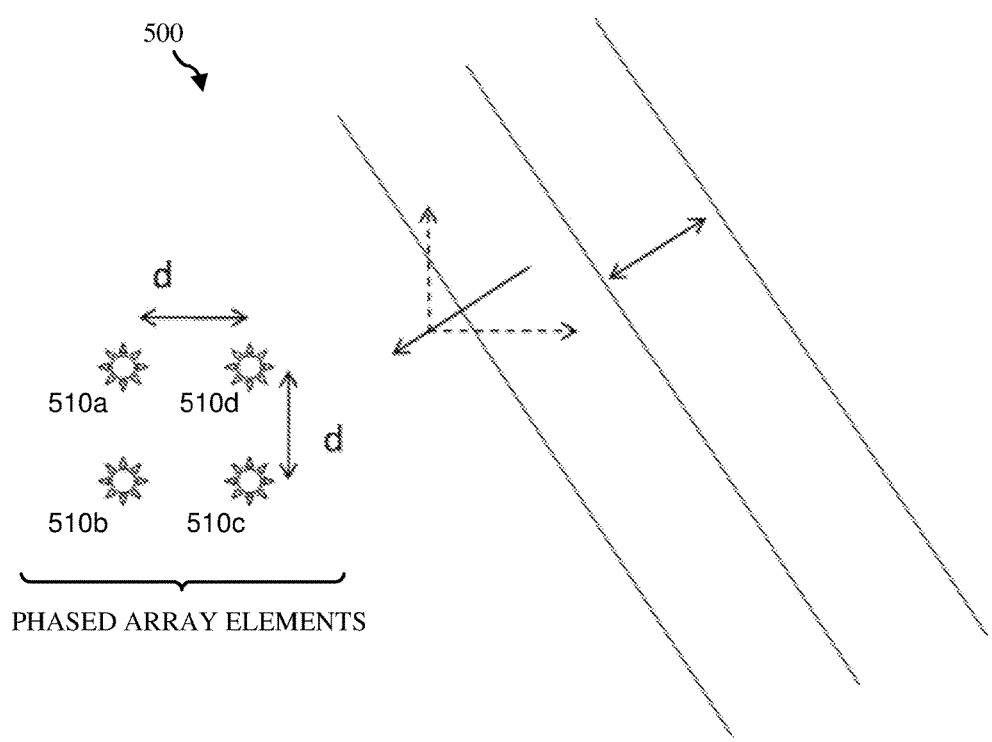
FIG. 5 is a diagram illustrating signal propagation in an implementation of phased-array antennas.

FIG. 5 is a diagram illustrating signal propagation 500 in an implementation of phased-array antennas. Phased array antennas use identical elements 510a through 510d (hereinafter referred to individually as an element 510 or collectively as elements 510). The direction in which the signal is propagated yields approximately identical gain for each element 510, while the phases of the elements 510 are different. Signals received by the elements are combined into a coherent beam with the correct gain in the desired direction. An additional consideration of the antenna design is the expected direction of the electrical field. In case the transmitter and/or receiver are rotated with respect to each other, the electrical field is also rotated in addition to the change in direction. This requires that a phased array be able to handle rotation of the electrical field by using antennas or antenna feeds that match a certain polarity and capable of adapting to other polarity or combined polarity in the event of polarity changes.

Information about signal polarity can be used to determine aspects of the transmitter of the signals. The power of a signal may be measured by different antennas that are polarized in different directions. The antennas may be arranged such that the antennas are polarized in orthogonal directions. For example, a first antenna may be arranged perpendicular to a second antenna where the first antenna represents a horizontal axis and the second antenna represents a vertical axis such that the first antenna is horizontally polarized and the second vertically polarized. Additional antennas may also be included, spaced at various angles in relation to each other. Once the receiver determines the polarity of the transmission the receiver may optimize performance by using the reception by matching the antenna to the received signal.

As noted above, a sector sweep procedure may be performed as part of an overall beamforming (BF) training process according to, for example, the IEEE 802.11ay standard that also involves a subsequent beamforming refinement protocol (BRP). The BF training process is typically employed by a pair of millimeter-wave stations, e.g., a receiver and transmitter. Each pairing of the stations achieves the necessary link budget for subsequent communication among those network devices. As such, BF training is a bidirectional sequence of BF training frame transmissions that uses sector sweep and provides the necessary signals to allow each station to determine appropriate antenna system settings for both transmission and reception. After the successful completion of BF training, a millimeter-wave communication link may be established with optimal receive and/or transmit antenna settings.

Example Reduction of Sector Sweep Time

As noted above, aspects of the present disclosure may help reduce time during sector sweep procedures. By utilizing a compressed frame format for sector sweep frames (e.g., by compressing or removing one or more bits from one or more fields or removing one or more frames entirely) the transmission time of each sector sweep frame may be reduced. The techniques may be applied to any types of devices taking part in beamforming training involving a sector sweep, such as game controller, mobile phones, or the like.

Figure 6:
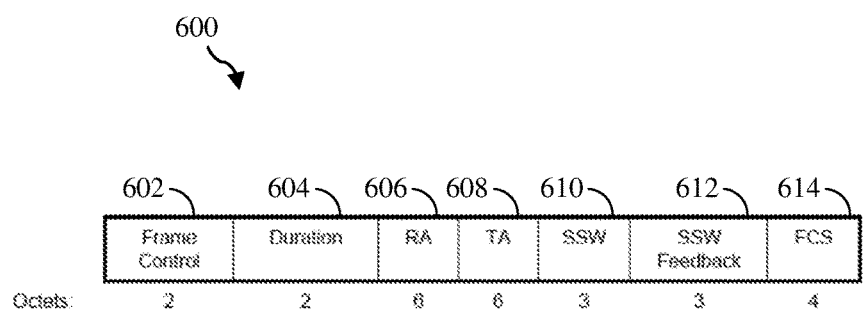
FIG. 6 illustrates a conventional sector sweep frame format.

FIG. 6 illustrates a conventional sector sweep (SSW) frame format that may be used in a sector sweep procedure. As will be described in greater detail below with reference to FIGS. 11, 12, and 13, a compressed frame format may be generated by compressing one or more of the fields illustrated in FIG. 6 (e.g., such that fewer bits are used to convey the same information) or by removing one or more of the fields entirely. The conventional sector sweep frame format 600 includes a frame control field 602, a duration field 604, a receiver address (RA) field 606, a transmitter address (TA) field 608, a sector sweep (SSW) field 610, a sector sweep (SSW) feedback field 612, and a frame control sequence (FCS) field 614.

Figure 7:
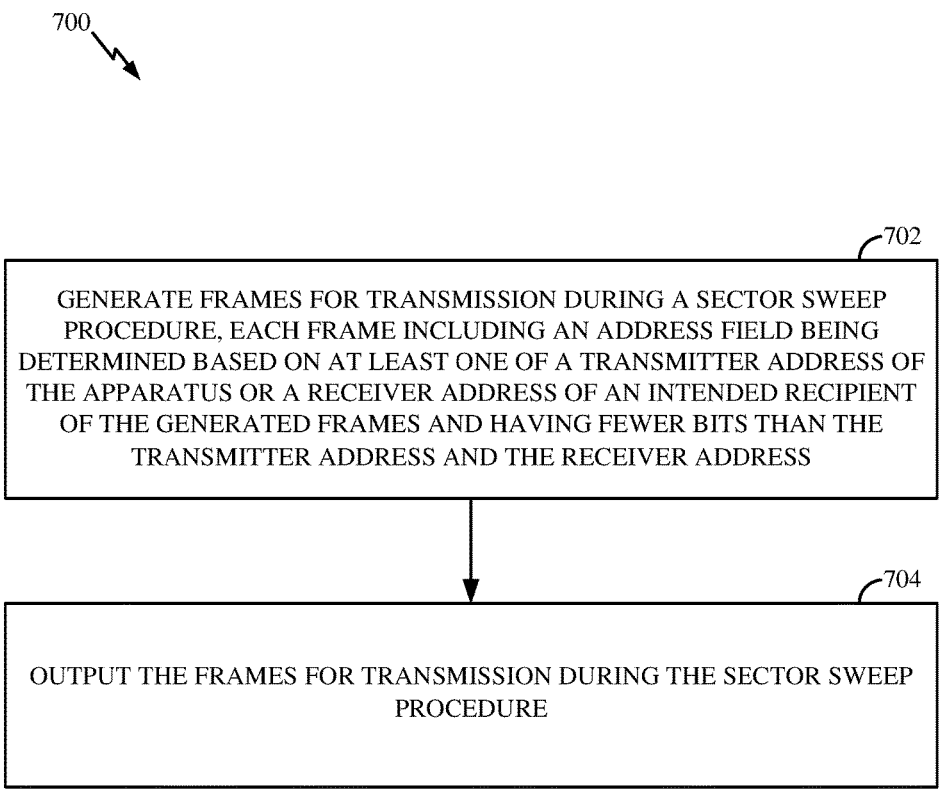
FIG. 7 illustrates example operations that may be performed by an apparatus for generating frames during a sector sweep procedure, in accordance with certain aspects of the present disclosure.

FIG. 7 illustrates example operations 700 that may be performed by an apparatus for generating sector sweep frames using a compressed frame format during a sector sweep procedure, in accordance with certain aspects of the present disclosure.

The operations 700 performed by the apparatus begin at 702, by generating frames for transmission during a sector sweep procedure, each frame including an address field being determined based on at least one of a transmitter address of the apparatus or a receiver address of an intended recipient of the generated frames and having fewer bits than the transmitter and the receiver addresses. For example, the address field may be generated using a hash function applied to both the transmitter and receiver addresses (with the transmitter and receiver addresses as input) and the resulting value output may have fewer bits than the transmitter and receiver addresses combined or, in some cases, fewer bits than either the transmitter address or the receiver addresses. At 704, an interface outputs the frames for transmission during the sector sweep procedure.

Figure 8:
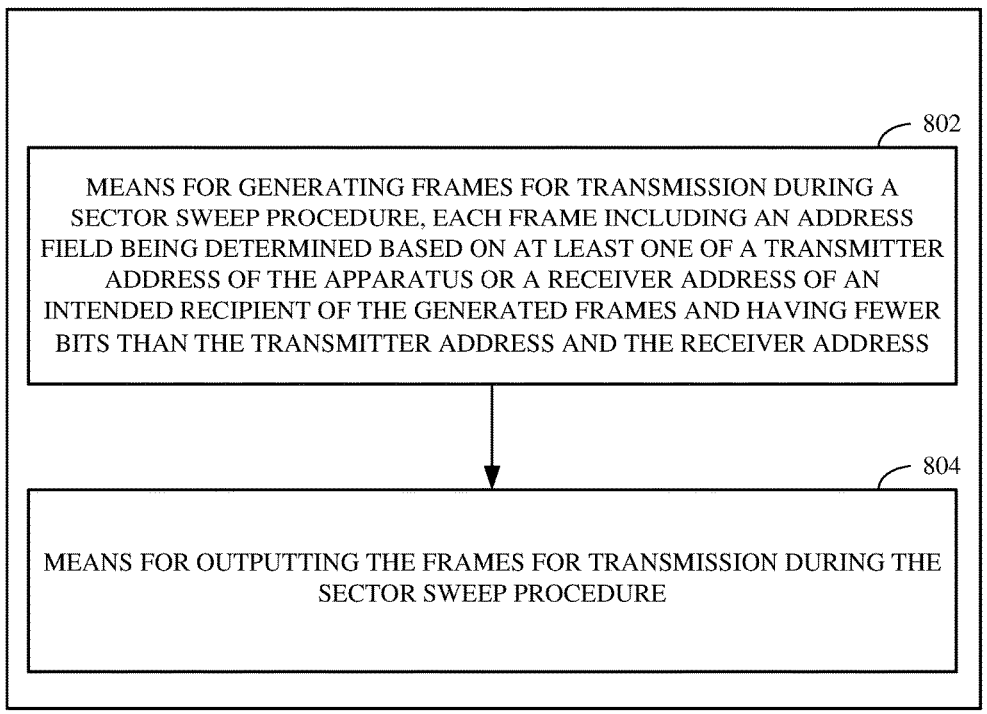
FIG. 8 illustrates components capable of performing the operations shown in FIG. 7, in accordance with certain aspects of the present disclosure.

FIG. 8 illustrates an apparatus for wireless communications 800 that corresponds to the exemplary method of FIG. 7. The apparatus for wireless communication 800 may correspond to the wireless device 302 and include a means for generating 802 frames for transmission during a sector sweep procedure, each frame including an address field being determined based on at least one of a transmitter address of the apparatus or a receiver address of an intended recipient of the generated frames and having fewer bits than the transmitter address and the receiver address. For example, the means for generating 802 may include the processing system 324. The processing system 324 may generate frames based on information received in one or more other frames received from outside sources.

The apparatus for wireless communications 800 may also include a means for outputting 804 the frames for transmission during the sector sweep procedure. For example, the means for outputting 804 may include the transceiver circuit/interface 314. The frames generated by the means for generating 802 may be output or communicated by the transceiver circuit/interface 314 during the sector sweep procedure.

Figure 9:
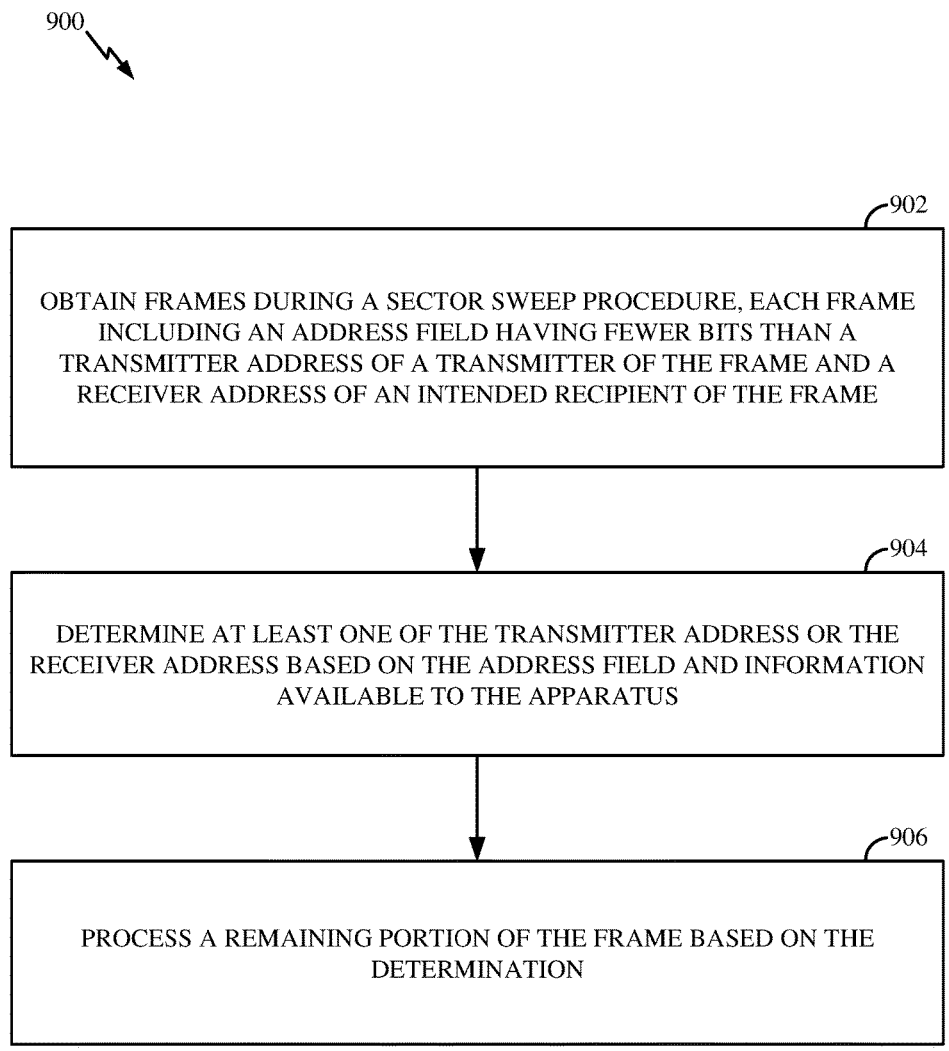
FIG. 9 illustrates example operation that may be performed by an apparatus for receiving frames during a sector sweep procedure, in accordance with certain aspects of the present disclosure.

FIG. 9 illustrates example operations 900 that may be performed by an apparatus for processing compressed sectors sweep frames during a sector sweep procedure, in accordance with certain aspects of the present disclosure. In other words, the operations 900 may correspond to complementary operations performed by a station that is participating in beamforming training with a station generating compressed sector sweep frames according to the operations 700 described above in FIG. 7.

The operations 900 performed by the apparatus begin at 902, by obtaining frames during a sector sweep procedure, each frame including an address field having fewer bits than a transmitter address of a transmitter of the frame and a receiver address of an intended recipient of the frame. At 904, the apparatus determines at least one of the transmitter address or the receiver address based on the address field and additional information, and at 906, the apparatus processes a remaining portion of the frame based on the determination. The additional information (which may be considered "side" information as it is not included in the frame), for example, may be one or more actual address stored in the receiver. In such cases, the compression (applied when generating the frame) may set the value of the address field to select between the stored addresses. A receiving device may check that the receiver address indicated by the value of the address field matches its own (to verify it is the intended recipient). In some cases, the additional information may indicate a hash value used to generate the value of the address field based on the transmitter and receiver addresses. In this manner, the receiving device may be able to determine what transmitter and receiver addresses (when the hash function was applied) would have resulted in the value received in the address field. In some cases, additional information may be provided to the receiving device (by a transmitting device), for example, during an association procedure.

Figure 11:
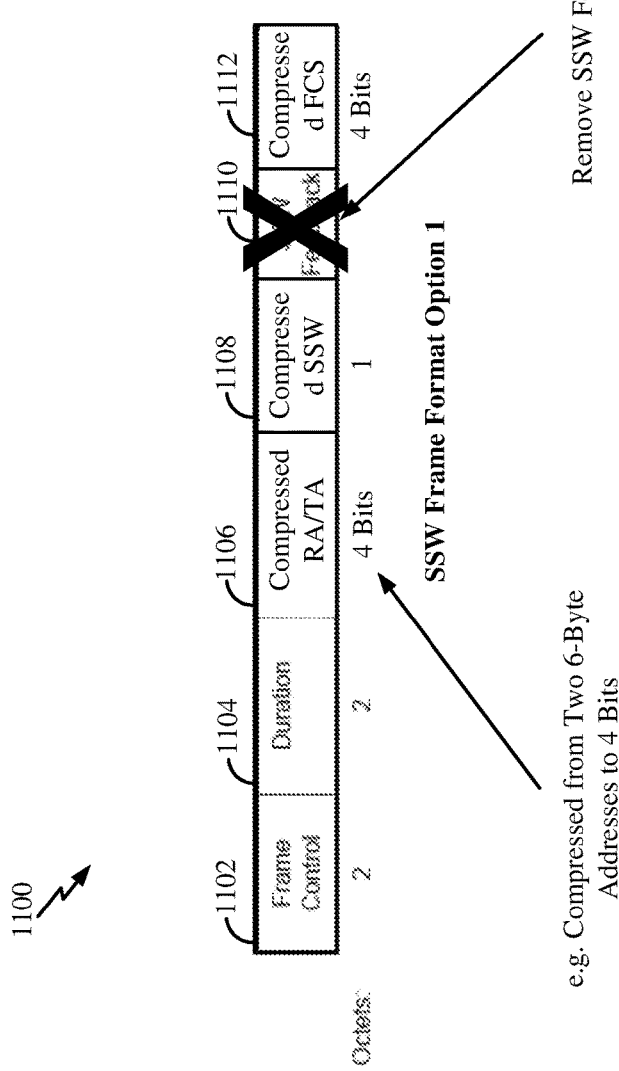
FIG. 11 illustrates an example of a sector sweep frame format, in accordance with certain aspects of the present disclosure.
Figure 12:
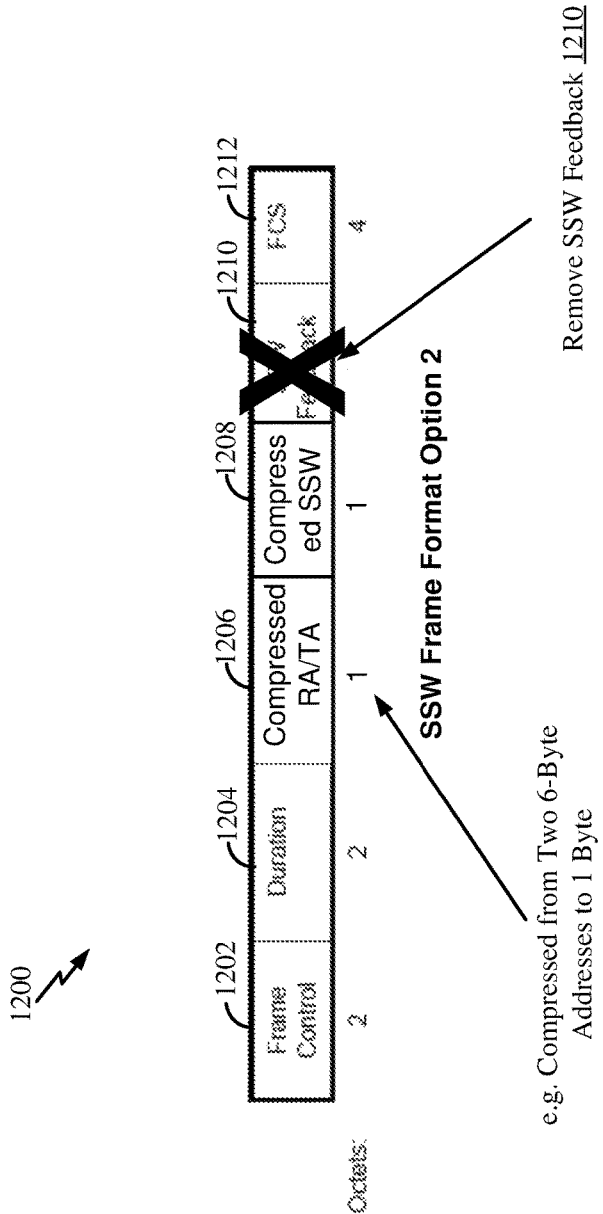
FIG. 12 illustrates another example sector sweep frame format, in accordance with certain aspects of the present disclosure.
Figure 13:
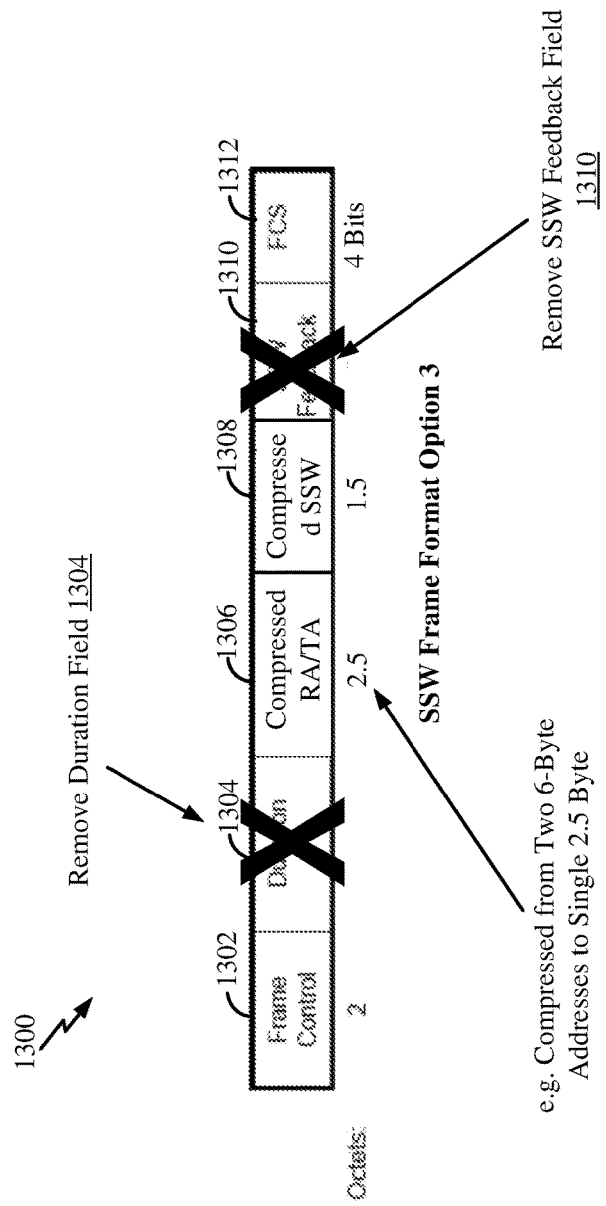
FIG. 13 illustrates another example sector sweep frame format, in accordance with certain aspects of the present disclosure.

In some cases a compress frame format may include an address field determined based on at least one of a transmitter address of the apparatus or a receiver address of an intended recipient of the generated (e.g., by applying a hash function). The amount of compression achieved in this manner may vary. For example, as shown in FIGS. 11, 12, and 13 a transmitter address (TA) field and a receiver address (RA) field, 6 bytes each, may be combined to form a single field with a length of one byte or less.

Figure 10:
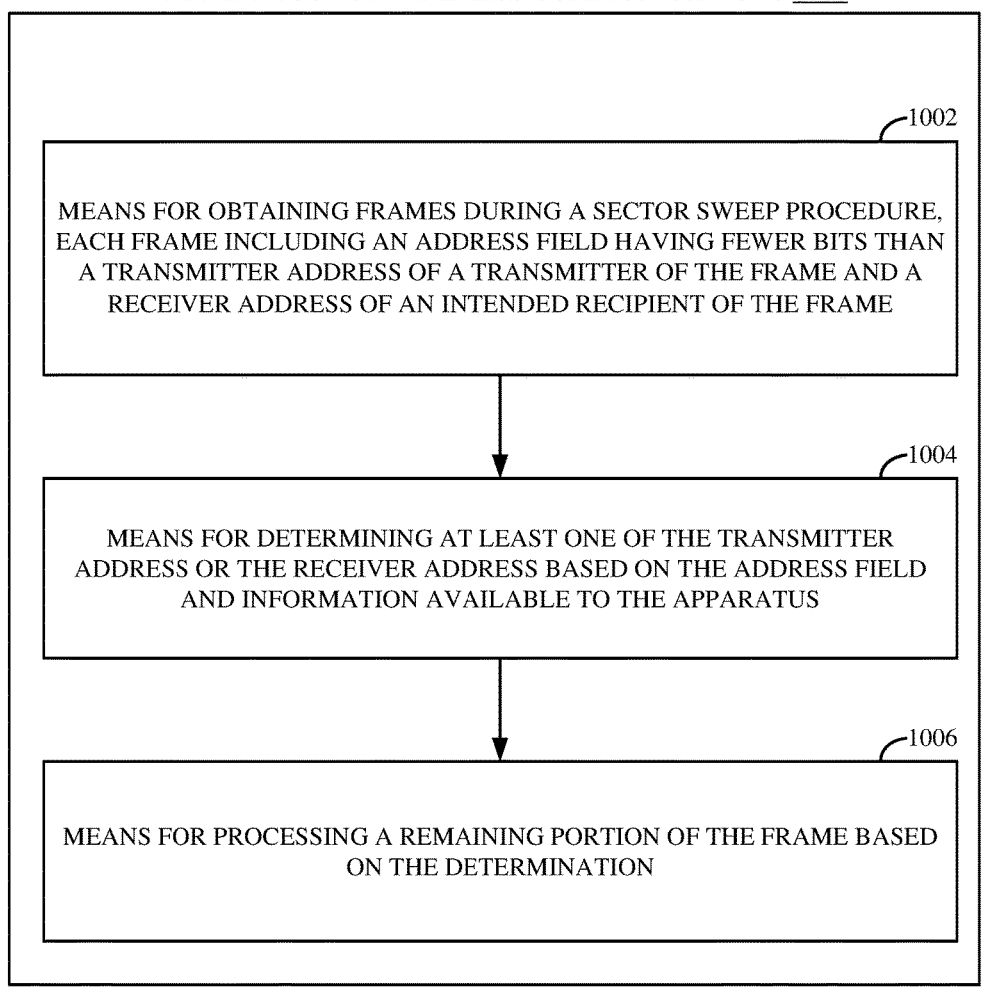
FIG. 10 illustrates components capable of performing the operations shown in FIG. 9, in accordance with certain aspects of the present disclosure.

FIG. 10 illustrates an apparatus for wireless communication 1000 that corresponds to the exemplary method of FIG. 9. The apparatus for wireless communication 1000 may include a means for obtaining 1002 frames during a sector sweep procedure, each frame including an address field having fewer bits than a transmitter address of a transmitter of the frame and a receiver address of an intended recipient of the frame. For example, the means for obtaining 1002 may include the transceiver circuit/interface 314 and the bus interface 322. The means for obtaining 1002 may receive frames from outside sources during a sector sweep procedure and communicate those frames to the processing system 324.

The apparatus for wireless communication 1000 may include a means for determining 1004 at least one of the transmitter address or the receiver address based on the address field and information available to the apparatus. For example, the frames received by the apparatus for wireless communication 1000 may include information in at least one field that the processing system 324 can establish as a transmitter address and/or a receiver address.

The apparatus for wireless communication 1000 may include a means for processing 1006 a remaining portion of the frame based on the determination. Similar to the means for determining 1004, the means for processing 1006 may correspond to the processing system 324. Based on the transmitter and/or receiver address, the means for processing 1006 may proceed to process the received frame based on the address information.

FIGS. 11, 12, and 13 illustrate example compressed sector sweep frame formats. Each of the compressed sector sweep frames may include Golay sequences as defined in the IEEE 802.11 standard. For example, the encoded address may include a Golay sequence number. In addition, the encoded address may include a frequency offset value. The frequency offset can be used to shift a frequency used for data transmission in order to reduce or eliminate interference with other transmissions.

FIG. 11 illustrates an example compressed sector sweep frame format 1100 (referred to herein as option 1), in accordance with certain aspects of the present disclosure. This example compressed sector sweep frame includes a frame control field 1102, a duration field 1104, a compressed receiver address (RA) and a transmitter address (TA) field 1106, a compressed sector sweep (SSW) field 1108, and a compressed frame control sequence (FCS) field 1112. This example of a compressed sector sweep frame format may yield a reduction of 20 Bytes in frame length (and corresponding reduction in sector sweep time). Part of the time reduction may be obtained by using a hash function, for example, a 6-byte receiver address (RA) and a 6-byte transmission address (TA) 1106, or a total of 96-bit of addresses, may be compressed to a half byte, or 4 bits.

The sector sweep frame format example of FIG. 11 further illustrates that a 4-byte frame check sequence (FCS) field 1112 may be shortened to 4 bits. Generally, FCS may be required for protecting data payload during the propagation of the payload to higher layers. However, because errors in the sector sweep frame do not propagate to higher layers, lower protection can be adequately provided.

In some cases, a 3-byte sector sweep feedback field 1110 may be removed in some cases because the sector sweep feedback field 1110 is only needed in a responder sweep. In some cases, a sector sweep frame can include a sector sweep field that indicates both a sector ID value and a sector sweep countdown value, and the sector sweep ID may equal to the sector sweep countdown number. In such cases, when no additional signaling for more antennas/RXSS length/Direction is needed. As the sector sweep ID and countdown value are typically carried in a sector sweep (SSW) field, the SSW frame length may be further reduced, for example, by compressing the SSW field from 3 bytes to 1 byte or 9 bits (e.g., by using a single sector sweep field for both sector sweep ID and sector sweep countdown) to create a compressed SSW field 1108. In some cases, a sector sweep frame may include a value indicating the address field is compressed (e.g., a frame format type with a value indicating an address field has fewer bits than a transmitter address and a receiver address; e.g., based on a value of a frame format type, a compressed address field may be identified and processed based on the identification). In some cases, sector sweep frames may be discarded (e.g., a receiver or transmitter address determined from an address field of the frame does not match any addresses of the receiver or transmitter; e.g., a generated FCS does not match the FCS included in a frame).

FIG. 12 illustrates another example of compressed sector sweep frame format 1200 (referred to herein as option 2), in accordance with certain aspects of the present disclosure. This example compressed sector sweep frame includes a frame control field 1202, a duration field 1204, a compressed receiver address (RA) and transmitter address (TA) field 1206, a compressed sector sweep (SSW) field 1208, and a compressed frame control sequence (FCS) field 1212. The sector sweep frame format example may result in a 16-byte reduction in length (and corresponding reduction from sector sweep time). In this example, the two 6-byte RA/TA addresses may be compressed to a single byte (compared to the half byte shown in FIG. 11). In this example, the FCS may be the same as conventional frame shown in FIG. 6, but the sector sweep feedback can be removed and the SSW field may still be compressed (in other words, a sector sweep frame may lack a sector sweep feedback field 1210).

FIG. 13 illustrates another example of compressed sector sweep frame format 1300 (referred to herein as option 3), in accordance with certain aspects of the present disclosure. This example compressed sector sweep frame includes a frame control field 1302, a compressed receiver address (RA) and transmitter address (TA) field 1306, a compressed sector sweep (SSW) field 1308, and a compressed frame control sequence (FCS) field 1312. In this example, the RA/TA addresses may be compressed from two 6-byte fields (96 bits total) to a single 2.5-byte field (20 bits), for example, using a 100 bit to 20 bit hash function. For associated wireless nodes, the uncompressed RA and TA addresses will be known, so the recipient can apply the hash function to the known addresses to see if the results match the value of the compressed RA/TA address field 1306.

In some cases, the compressed RA and TA field 1306 may also be based on a scrambler seed or a physical (PHY) header cyclic redundancy check (CRC) of the SSW frame. The scrambler seed may be different per SSW procedure or per SSW frame. Dependency on the scrambler seed in this manner may help ensure that a wireless node that has incorrectly detected its own RA after uncompressing the compressed TA/RA field 1306 will not repeat this false detection. Of course, reducing the amount of compression (e.g., using more bits for the output of the hash function) may further reduce the chances for a false RA match.

As illustrated, the FCS field may also be compressed, for example, from 4 bytes to half a byte (4 bits), which may have a relatively low impact on false positives. The duration field 1304 and the sector sweep feedback field 1310 may also be removed (so the SSW frame lacks these fields). In some cases, the duration field 1304 may be compressed by either quantization to lower resolution (e.g., greater than 1 μs so fewer bits are needed to indicate a given duration) or use a same resolution with a shorter length (meaning a shorter maximum duration can be indicated), for example, taking the countdown ID into consideration.

As illustrated, the SSW field may also be compressed (e.g., from 3 bytes to 1.5 bytes). This SSW compression may be achieved, for example, by using a 12 bit countdown field, with 10 bits for sectors and 2 bits for antennas (or some other similar type bit allocation).

Figure 14:
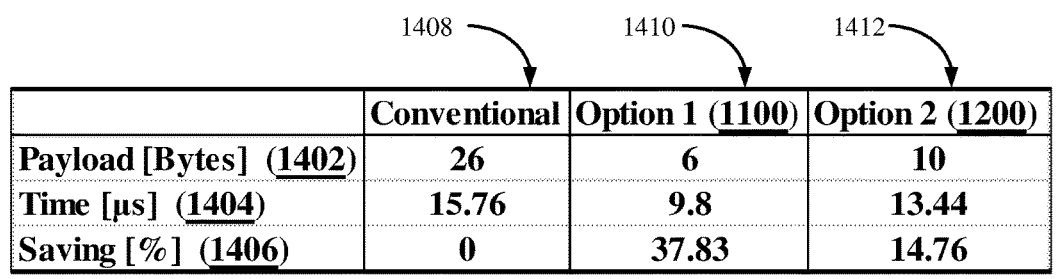
FIG. 14 illustrates a tabular representation providing examples of advantages of sector frame formats in accordance with certain aspects of the present disclosure.

FIG. 14 illustrates a table providing example reductions of sector sweep time that may be accomplished using the frame formats (1100 and 1200) shown in FIG. 11 (option 1) and 12 (option 2) relative to the conventional sector sweep frame format 600 shown in FIG. 6 (conventional). The table includes: a first row indicative of a number of payload bytes 1402 in each frame, a second row indicative of a sweep time 1404, and a third row indicative of a saving percentage 1406 that represents a reduction ratio between option 1 or option 2 (1100 and 1200), and the conventional sector sweep fame format 600. The conventional column 1408 shows a number of bytes, sweep time, and a percentage indicative of a reduction ratio associated with the payload of the conventional sector sweep frame format 600. The percentage of the conventional column 1408 is zero because the values of the conventional column 1408 are being used as a basis for comparison with certain alternative options disclosed herein. For example, an option 1 column 1410 shows the number of bytes, sweep time, and the percentage indicative of a reduction ratio between the payload of the conventional sector sweep frame format 600 and the sector sweep frame of option 1 (1100). In another example, an option 2 column 1412 shows the number of bytes, sweep time, and the percentage indicative of the reduction ratio between the payload of the conventional sector sweep frame format 600 and the sector sweep frame of option 2 (1200).

As illustrated, by utilizing option 1 illustrated in FIG. 11, reductions of up to 37% may be achieved, while utilizing option 2 illustrated in FIG. 12, may yield reductions of up to 15%. The exact yield achieved may represent a tradeoff between reductions in transmission time and an increase probability of undetected errors. Further, the reduction in sector sweep time may be orthogonal (e.g., independent of) to other methods that reduce the sector sweep time.

Because there can be hundreds of sectors that need to be sweep during a sector sweep procedure, the accumulative time reduction in sector sweep time using the compressed frame formats described herein during a sector sweep procedure can be significant. For example, a device with a relatively large antenna array may need additional sectors to be used for training, and an AP with 256 antennas that use 256 sectors may spend 4 milliseconds (ms) for sector sweep. Thus, the aggregate sector sweep time for training of ten wireless nodes can be greater than 40 ms. Therefore, utilizing the compressed frame formats described herein to reduce transmission time of each frame may result in significant performance improvements.

Figure 15:
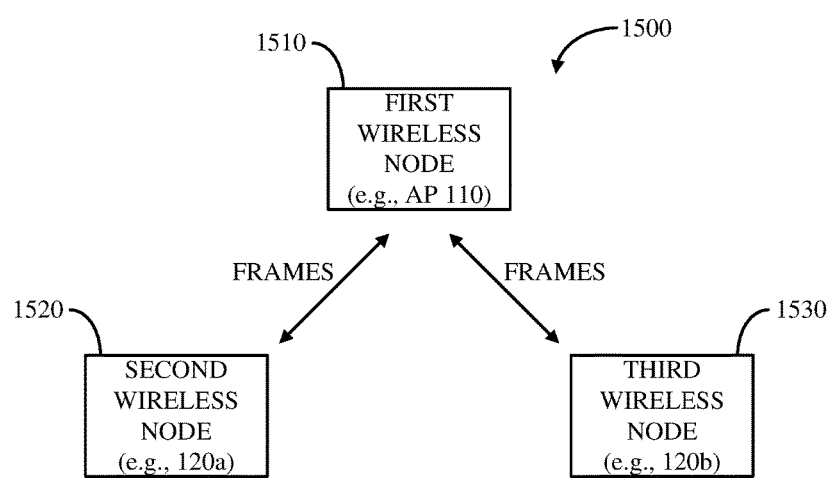
FIG. 15 illustrates a block diagram of an exemplary wireless communication system in accordance with another with certain aspects of the disclosure.

FIG. 15 illustrates a block diagram of an exemplary wireless communication system 1500 in accordance with certain aspects of the disclosure. In this example, the wireless communication system 1500 includes a first wireless node 1510 (e.g., access point 110), a second wireless node 1520 (e.g., user terminal 120a), and a third wireless node 1530 (e.g., user terminal 120b).

Because of the use of compressed (generally encoded) transmitter address and/or receiver address in SSW frames, there is a non-zero probability of an address collision. That is, a compressed address may be decompressed (generally decoded) into two distinct media access control (MAC) addresses by two wireless nodes, respectively. For instance, a wireless node may process received SSW frames as it they were destined for that wireless node, when in fact, the SSW frames were intended for another wireless node. The MAC may include a carrier sense multiple access/collision avoidance (CSMA/CA) based distributed coordination function (DCF) and a point coordination function (PCF). The DCF allows for access of a medium without central control. The PCF is deployed at an access point (AP) to provide central control. The DCF and PCF utilize various gaps between consecutive transmissions to avoid collisions. Transmissions may be referred to as frames, and a gap between frames is referred to as an inter-frame spacing (IFS). Frames may be user data frames, control frames or management frames. This is explained in more detail with reference to the following example.

Figure 16:
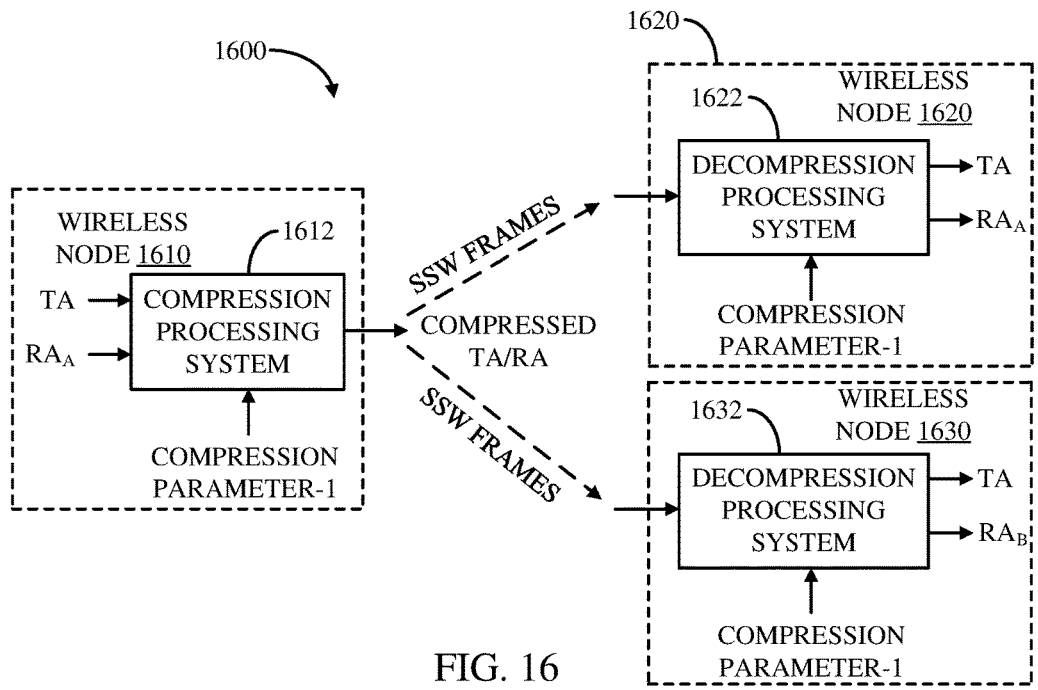
FIG. 16 illustrates a block diagram of an exemplary communication system experiencing an address collision in sector sweep frames in accordance with certain aspects of the disclosure.

FIG. 16 illustrate a block diagram of an exemplary wireless communication system 1600 experiencing an address collision in sector sweep (SSW) frames in accordance with certain aspects of the disclosure. The communication system 1600 includes a first wireless node 1610 having a compression processing system 1612, a second wireless node 1620 having a decompression processing system 1622, and a third wireless node 1630 having a decompression processing system 1632.

The compression processing system 1612 of the first wireless node 1610 receives a transmitter address (TA) (e.g., a MAC address of the first wireless node 1610), and a receiver address ($RA_A$) (e.g., a MAC address of the second wireless node 1620). As indicated, in this example, the second wireless node 1620 is the target (destination node) of the SSW frames to be transmitted by the first wireless node 1610. The compression processing system 1612 receives a compression parameter-1. The compression processing system 1612 generates a compressed TA/RA based on the TA, $RA_A$, and compression parameter-1. As some examples, the compression parameter-1 may include any one of a particular seed for a hash function, a parameter for generating a particular Association Identifier (AID) as the compressed TA/RA, and a parameter for generating a particular Base Service Set (BSS) color as the compressed TA/RA. The AID and/or the BSS color may be any encoded address for identifying one or more wireless nodes as destination for one or more frames. The first wireless node 1610 transmits the SSW frames including the compressed TA/RA. In some embodiments, the encoded address may include a random number generated by a random number generator algorithm. In this example, the random number encrypts the address identifying one or more wireless destination nodes. In another embodiment, the encoded address may be defined based on a unique identifier associated with the first wireless node or the second wireless node. A node may use the unique identifier as an index for a lookup table to determine one or more parameters (e.g., a first parameter) to be used for communicating with another node. For example, the number of bits of the address may constitute the unique identifier. In another example, the unique identifier may be one or more bits of the address field.

In this example, both the second wireless node 1620 and the third wireless node 1630 receive the SSW frames. The decompression processing system 1622 of the second wireless node 1620 receives the compressed TA/RA from the received SSW frames. The decompression processing system 1622 further receives the compression parameter-1. The compression parameter-1 may be the same as the compression parameter-1 used by the compression processing system 1612 of the first wireless node 1610. For example, the compression parameter-1 may be a seed for a hash function, a parameter for translating the AID to the uncompressed TA/RA, and a parameter for translating the BSS color to the uncompressed TA/RA. In this example, the decompression processing system 1622 generates the correct TA of the first wireless node 1610 and the correct $RA_A$ of the second wireless node 1620. For instance, the $RA_A$ may be part of a set of receiver addresses to which the compressed TA/RA points. The second wireless node 1620 knows that it is a target of the SSW frames since the receiver address $RA_A$ is in the set to which the compressed TA/RA points.

The decompression processing system 1632 of the third wireless node 1630 also receives the compressed TA/RA from the received SSW frames. The decompression processing system 1632 further receives the compression parameter-1. Similarly, the compression parameter-1 may be the same as the compression parameter-1 used by the compression processing system 1612 of the first wireless node 1610. For example, the compression parameter-1 may be a seed for a hash function, a parameter for translating the AID to the uncompressed TA/RA, and a parameter for translating the BSS color to the uncompressed TA/RA. In this example, the decompression processing system 1632 generates the TA of the first wireless node 1610 and the $RA_B$ of the third wireless node 1630. For instance, the $RA_B$ may also be part of the set of receiver addresses to which the compressed TA/RA points. In this case, the second wireless node 1620 falsely believes it is the target of the SSW frames since the receiver address $RA_B$ is in the set to which the compressed TA/RA points.

In the above example, the third wireless node 1630 processes the SSW frames as if they were destined for the third wireless node 1630, when, in fact, they were destined for the second wireless node 1620. This is because the compression processing system 1612 generates the same compressed TA/RA using the compression parameter-1 for a set of RAs. In this example, the $RA_A$ of the second wireless node 1620 and the $RA_B$ of the third wireless node 1630 are both in the set of RAs that produce the same compressed TA/RA based on the compression parameter-1. This is termed as an address collision where a compressed address identifies in two or more wireless nodes as target devices or same destination nodes for receiving SSW frames, when only one of them is the target or destination wireless node.

Figure 17:
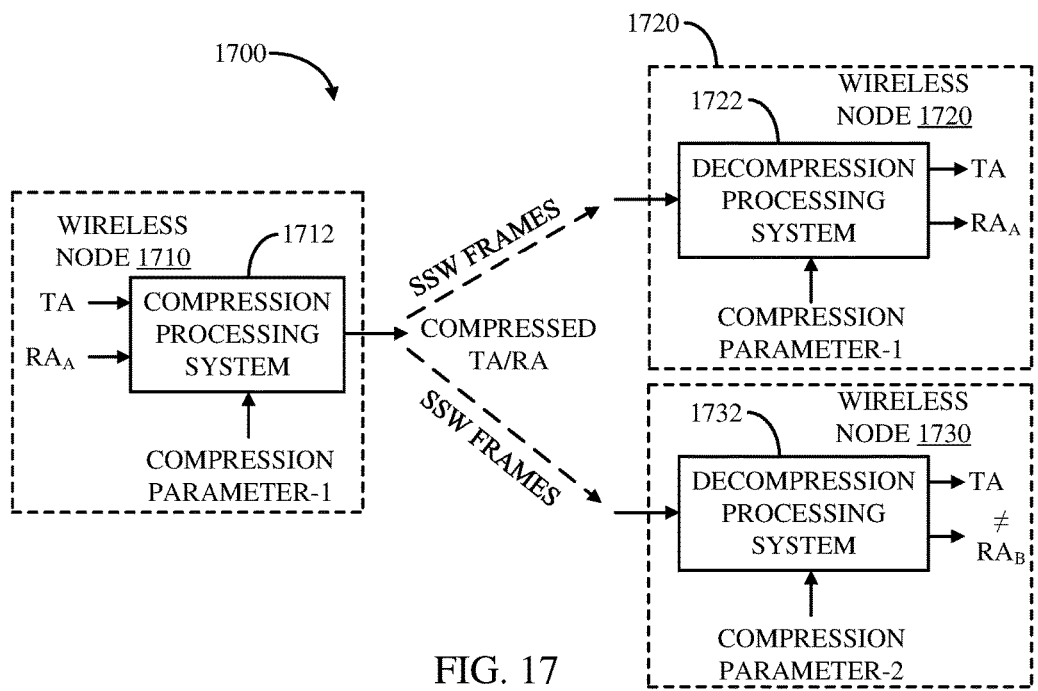
FIG. 17 illustrates a block diagram of an exemplary communication system with no address collisions occurring in sector sweep frames due to a method of reducing address collisions in accordance with certain aspects of the disclosure.

FIG. 17 illustrate a block diagram of exemplary wireless communication system 1700 with no address collision occurring in sector sweep (SSW) frames due to a method of reducing address collisions in accordance with certain aspects of the disclosure. Similarly, the wireless communication system 1700 includes a first wireless node 1710 having a compression processing system 1712, a second wireless node 1720 having a decompression processing system 1722, and a third wireless node 1730 having a decompression processing system 1732.

In this example, the first wireless node 1710 determined that a potential address collision exists if the third wireless node 1630 uses compression parameter-1 as previously discussed with reference to wireless communication system 1600. Thus, in response to the potential address collision, the first wireless node 1710 transmits a frame to the third wireless node 1630, wherein the frame includes an instruction indicating not to use the compression parameter-1 for decompressing (generally decoding) the compressed TA/RA in SSW frames. Accordingly, as illustrated in wireless communication system 1700, the third wireless node 1630 uses compression parameter-2 instead of the forbidden decompression parameter-1.

To summarize this scenario, the compression processing system 1712 of the first wireless node 1710 receives a transmitter address (TA) (e.g., a MAC address of the first wireless node 1710), and a receiver address ($RA_A$) (e.g., a MAC address of the second wireless node 1720). Similarly, in this example, the second wireless node 1720 is the target of the SSW frames to be transmitted by the first wireless node 1710. The compression processing system 1712 receives a compression parameter-1. The compression processing system 1712 generates a compressed TA/RA based on the TA, $RA_A$, and compression parameter-1. As examples, the compression parameter-1 may include any one of a particular seed for a hash function, a parameter for generating a particular Association Identifier (AID) as the compressed TA/RA, and a parameter for generating a particular Base Service Set (BSS) color as the compressed TA/RA. The first wireless node 1710 transmits the SSW frames including the compressed TA/RA.

In this example, both the second wireless node 1720 and the third wireless node 1730 receive the SSW frames. The decompression processing system 1722 of the second wireless node 1720 receives the compressed TA/RA from the received SSW frames. The decompression processing system 1722 further receives the compression parameter-1. The compression parameter-1 may be the same as the compression parameter-1 used by the compression processing system 1712 of the first wireless node 1710. For example, the compression parameter-1 may be a seed for a hash function, a parameter for translating the AID to the uncompressed TA/RA, and a parameter for translating the BSS color to the uncompressed TA/RA. In this example, the decompression processing system 1722 generates the correct TA of the first wireless node 1710 and the correct $RA_A$ of the second wireless node 1720. For instance, the $RA_A$ may be part of a set of receiver addresses to which the compressed TA/RA points. The second wireless node 1720 knows that it is a target of the SSW frames since the receiver address $RA_A$ is in the set to which the compressed TA/RA points.

Similarly, the decompression processing system 1732 of the third wireless node 1730 receives the compressed TA/RA from the received SSW frames. In this case, because of the potential address collision was previously detected, the decompression processing system 1732 receives a different compression parameter-2. The compression parameter-2 may be different than the compression parameter-1 used by the compression processing system 1712 of the first wireless node 1710. For example, the compression parameter-2 may also a seed for a hash function, a parameter for translating the AID to the uncompressed TA/RA, and a parameter for translating the BSS color to the uncompressed TA/RA. In this example, the decompression processing system 1732 generates at least one receiver address that does not the receiver address $RA_B$ of the third wireless node 1730. For instance, the receiver address $RA_B$ is not part of a set of receiver addresses to which the compressed TA/RA points based on the compression parameter-2. Accordingly, the third wireless node 1730 knows it is not the target of the SSW frames, and does not process or ignores the SSW frames; thereby, avoiding the address collision and avoiding power consumption in unnecessarily processing the SW frames.

The use of a different parameter by third wireless node 1730 resolves the address collision with second wireless node 1720 for SSW frames from the first wireless node 1710 or received from another wireless node.

Figure 18:
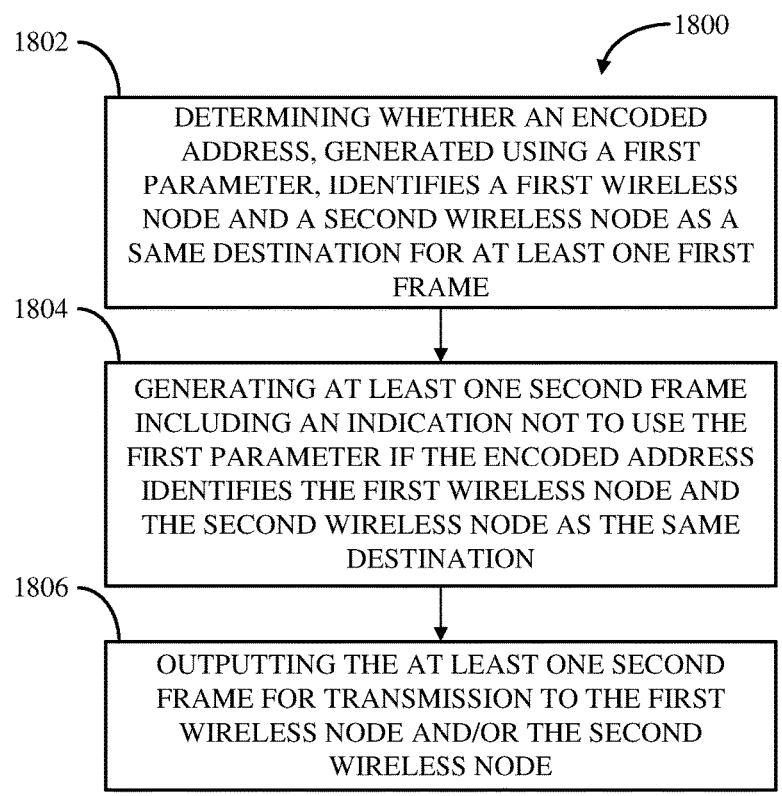
FIG. 18 illustrates an exemplary method of reducing address collisions in sector sweep frames in accordance with certain aspects of the present disclosure.

FIG. 18 illustrates an exemplary method 1800 of reducing potential address collision in sector sweep (SSW) frames in accordance with certain aspects of the disclosure. The method 1800 may be implemented by any type of wireless node, such as an AP or an access terminal (AT). For explanation purposes, the first wireless node 1710 in wireless communication system 1700 is exemplified as implementing the method 1800 to reduce avoid address collisions.

The method 1800 includes determining whether an encoded address (e.g., a compressed address), generated using at least a first parameter (e.g., a compression parameter) identifies a first wireless node and a second wireless node as the same destination address for at least one first frame (block 1802). That is, an address collision has been detected. Such determination may be based on first and second uncompressed (e.g., MAC) addresses of the first and second wireless nodes and the first compression parameter. For instance, a first compressed address for the first wireless node is determined based on the first compression parameter and the MAC address of the first wireless node. Then, a second compressed address for the second wireless node is determined based on the first compression parameter and the MAC address of the second wireless node. Then, it is determined that the second compressed address is the same as the first compressed address.

As an example, during an association frame exchange between the first wireless node 1710 and the second wireless node 1720, the first wireless node 1710 receives the MAC address of the second wireless node 1620. During the association frame exchange or other communications between the first wireless node 1710 and the second wireless node 1720, the first wireless node 1710 and second the wireless node 1720 decide to use a first compression parameter (e.g., compression parameter-1) for compressing and decompressing at least one address in SSW frames.

During a subsequent association frame exchange between the first wireless node 1710 and the third wireless node 1730, the first wireless node 1710 receives the MAC address of the third wireless node 1730. In this case, the first wireless node 1710 determines that using the MAC address of the third wireless node 1730 and the first compression parameter (e.g., compression parameter-1) would result in the same compressed address that targets the second wireless node 1720; that is, the compressed address targets both the second wireless node 1720 and the third wireless node 1730.

Accordingly, the method 1800 further comprising generating at least one second frame including an indication not to use the first parameter if the encoded address identifies the first wireless node and the second wireless node as the same address (block 1804). For example, the at least one second frame may include instruction not to use the first compression parameter (e.g., the first compression parameter is forbidden). Alternatively, the at least one second frame may include instruction to use another compression parameter different than the first compression parameter, such as a second compression parameter.

The method 1800 further includes outputting the at least one second frame for transmission to at least one of the first wireless node or the second wireless node (block 1806). For example, in the case of wireless communication system 1700, the first wireless node 1710 transmitted the frame to the third wireless node 1730. In response to receiving the frame, the third wireless node 1730 use compression parameter-2 to decompress SSW frames. As a result, when the first wireless node 1710 or another wireless node transmits SSW frames (including the compressed address determined based on compression parameter-1) intended for the second wireless node 1720, the third wireless node 1730 determines that it is not the target wireless device of the SSW frames because the decompressed address generated using the second compression parameter-2 does not identify the MAC address of the third wireless node 1730. For instance, the MAC address of the third wireless node 1730 is not on the list of addresses to which the compressed address points.

Alternatively, instead of sending the at least one second frame to the third wireless node 1730, the first wireless node 1710 may send the at least one second frame to the second wireless node 1720. In this case, the second wireless node 1720 may use a different compression parameter, such as compression parameter-2 for decompressing SSW frames from the first wireless node 1710. The first wireless node 1710 may send a frame instructing the third wireless node 1730 to use the first compression parameter-1. Thus, to avoid address collision, in this example, the second wireless node 1720 uses the second compression parameter-2 to decompress the compressed address in SSW frames received from the first wireless node 1710 or another wireless node, and the third wireless node 1730 uses the first compression parameter-1 to decompress the compressed address in SSW frames received from the first wireless node 1710 or another wireless node.

Alternatively, the first wireless node 1710 may transmit the at least one second frame indicating not to use of a particular compression parameter for decompressing SSW frames, such as the first compression parameter-1, to both the second wireless node 1720 and the third wireless node 1730. For instance, the at least one second frame transmitted to the second wireless node 1720 may include an instruction to use a particular compression parameter, such as compression parameter-2. The at least one second frame transmitted to the third wireless node 1730 may include an instruction to use another particular compression parameter, such as compression parameter-3. Thus, in this example, address collision is avoided by the second wireless node using compression parameter-2 for decompressing compressed address in received SSW frames and the third wireless node 1730 using compression parameter-3 for decompressing compressed address in received SSW frames.

Figure 19:
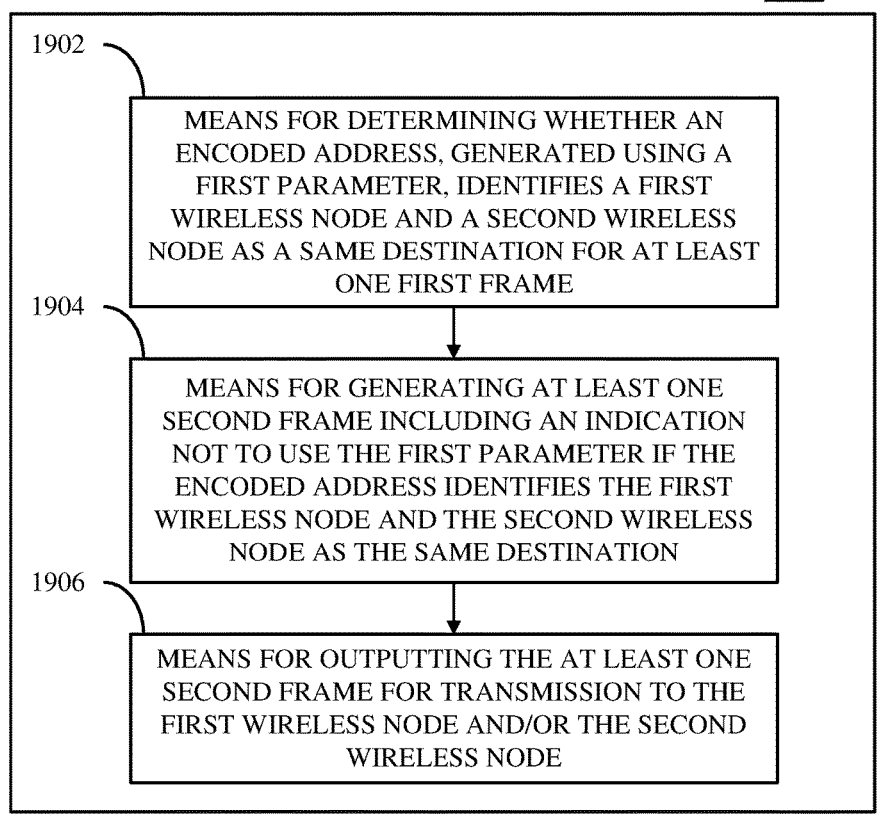
FIG. 19 illustrates components capable of performing the operations shown in FIG. 18, in accordance with certain aspects of the present disclosure.

FIG. 19 illustrates an apparatus for wireless communication 1900 that corresponds to the exemplary method of FIG. 18. The apparatus for wireless communication 1900 may include a means for determining 1902 whether an encoded address, generated using at least a first parameter, identifies a first wireless node and a second wireless node as a same destination for at least one first frame. The means for determining may correspond to the processing system 324. For example, the means for determining may identify data in at least one field of a frame that indicates whether an encoded address is an identifier of a node having the same destination as another node.

The apparatus for wireless communication 1900 may include a means for generating 1904 at least one second frame including an indication not to use the first parameter if the encoded address identifies the first wireless node and the second wireless node as the same destination. The means for generating 1904 may correspond to the processing system 324. For example, the means for generating 1904 may be configured to generate a frame based on information provided in a previous frame regarding the destination addresses.

The apparatus for wireless communication 1900 may include a means for outputting 1906 the at least one second frame for transmission to the first wireless node and/or the second wireless node. The means for outputting may include the transceiver circuit/interface 314. For example, the apparatus for wireless communication 1900 may transmit a frame via an RF frequency, wherein the frame contains data that was generated based on the indication provided in the first frame.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700, 900, and 1800 illustrated in FIGS. 7, 9, and 18 correspond to means 800, 1000, and 1900 illustrated in FIGS. 8, 10, and 19.

For example, means for receiving may include a receiver (e.g., the receiver unit 222), and/or an antenna(s) 224 of the access point 110. The means for receiving may also include a receiver (e.g., the receiver unit 254) and/or an antenna(s) 252 of the user terminal 120 illustrated in FIG. 2. Alternatively, means for receiving may include a transceiver circuit 314, the receiver circuit 312, and/or antenna(s) 316 depicted in FIG. 3. Means for outputting may include a transmitter (e.g., the transmitter unit 222) and/or the antenna(s) 224 of the access point 110, and/or the transmitter (e.g., the transmitter unit 254) and/or an antenna(s) 252 of the user terminal 120 illustrated in FIG. 2. Alternatively, means for transmitting may include the transceiver circuit 314, the transmitter circuit 310 and/or antenna(s) 316 depicted in FIG. 3. Means for processing, means for determining, means for generating, or means for calculating include a processing system, which may include a processing system of one or more processors, such as the RX data processor 242, the TX data processor 210, and/or the controller 230 of the access point 110 illustrated in FIG. 2 or the processing system 324, the processing circuit 304, and/or the DSP 320 portrayed in FIG. 3.

The means for determining may calculate or analyze the encoded address that was generated using one or more parameters (e.g., a first parameter) to establish whether the encoded address identifies a first wireless node and a second wireless node as a same destination for at least one frame (e.g., a first frame). The means for generating may produce a frame (e.g., a second frame) that includes an indication not to use the first parameter if the encoded address identifies the first wireless node and the second wireless node as the same destination. For example, the indication may be a bit in a field of the frame, an arrangement of the frames, or associated with a time the frame is outputted. The means for outputting may include an interface for wireless or wired communication of data configured to communicate the at least one second frame for transmission to at least one of the first wireless node or the second wireless node over the interface.

In some cases, rather than actually transmitting a frame a device may have an interface to output a frame for transmission. For example, a processor may output a frame, via a bus interface, to the RF front end for transmission. Similarly, rather than actually receiving a frame, a device may have an interface to obtain a frame received from another device. For example, a processor may obtain (or receive) a frame, via a bus interface, from the RF front end for reception.

According to certain aspects, such means may be implemented by processing systems configured to perform the corresponding functions by implementing various algorithms (e.g., in hardware or by executing software instructions) described above for generating frames for transmission during a sector sweep procedure.

As used herein, the term "generating" encompasses a wide variety of actions. For example, "generating" may include calculating, causing, computing, creating, determining, processing, deriving, investigating, making, producing, providing, giving rise to, leading to, resulting in, looking up (e.g., looking up in a table, a database or another data structure), ascertaining and the like. Also, "generating" may include receiving (e.g., receiving information), accessing (e.g., accessing data in a memory) and the like. Also, "generating" may include resolving, selecting, choosing, establishing and the like.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like. Also, "determining" may include measuring, estimating and the like.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any such list including multiples of the same members (e.g., any lists that include aa, bb, or cc).

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may include a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein include one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may include a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may include packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the wireless node, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface in the case of an access terminal), supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may include a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may include non-transitory computer-readable media (e.g., tangible media). In addition, for other aspects computer-readable media may include transitory computer-readable media (e.g., a signal). Combinations of the above should also be included within the scope of computer-readable media.

Thus, certain aspects may include a computer program product for performing the operations presented herein. For example, such a computer program product may include a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
   a processing system configured to:
      determine whether an encoded address, generated using at least one first parameter, identifies a first wireless node and a second wireless node as a same destination for at least one first frame including the encoded address, and
      generate at least one second frame including an indication not to use the at least one first parameter if the encoded address identifies the first wireless node and the second wireless node as the same destination; and
   an interface configured to output the at least one second frame for transmission to at least one of the first wireless node or the second wireless node.

2. The apparatus of claim 1, wherein the processing system is configured to determine whether the encoded address identifies the first wireless node and the second wireless node as the same destination based on an address of the first wireless node.

3. The apparatus of claim 2, wherein the address of the first wireless node comprises a media access control (MAC) address of the first wireless node.

4. The apparatus of claim 1, wherein the processing system is configured to determine whether the encoded address identifies the first wireless node and the second wireless node as the same destination based on an address of the first wireless node and an address of the second wireless node.

5. The apparatus of claim 4, wherein the address of the first wireless node comprises a media access control (MAC) address of the first wireless node, and the address of the second wireless node comprises a MAC address of the second wireless node.

6. The apparatus of claim 1, wherein the at least one first parameter comprises a seed for a hash function to generate the encoded address.

7. The apparatus of claim 1, wherein the at least one first parameter comprises at least one of:
   an Association Identifier (AID),
   a random number used for connection,
   a Golay sequence number, or
   a frequency offset value.

8. The apparatus of claim 1, wherein the encoded address comprises a Base Service Set (BSS) color.

9. The apparatus of claim 1, wherein the processing system is configured to determine whether the encoded address identifies the first wireless node and the second wireless node as the same destination based on at least one frame obtained pursuant to an association with the second wireless node.

10. The apparatus of claim 1, wherein the indication comprises an instruction to use a second parameter, wherein the second parameter is different from the at least one first parameter.

11. The apparatus of claim 1, wherein the processing system is configured to determine whether the encoded address identifies the first wireless node and the second wireless node as the same destination by at least:
   generating the encoded address based on the at least one first parameter and an address of the first wireless node;
   generating a second encoded address based on the at least one first parameter and an address of the second wireless node; and
   determining whether the second encoded address is the same as the encoded address.

12. A method for wireless communications, comprising:
   determining whether an encoded address, generated using at least one first parameter, identifies a first wireless node and a second wireless node as a same destination for at least one first frame including the encoded address;
   generating at least one second frame including an indication not to use the at least one first parameter if the encoded address identifies the first wireless node and the second wireless node as the same destination; and
   outputting the at least one second frame for transmission to at least one of the first wireless node or the second wireless node.

13. The method of claim 12, wherein determining whether the encoded address identifies the first wireless node and the second wireless node as the same destination is based on an address of the first wireless node.

14. The method of claim 13, wherein the address of the first wireless node comprises a media access control (MAC) address of the first wireless node.

15. The method of claim 12, wherein determining whether the encoded address identifies the first wireless node and the second wireless node as the same destination is based on an address of the first wireless node and an address of the second wireless node.

16. The method of claim 15, wherein the address of the first wireless node comprises a media access control (MAC) address of the first wireless node, and the address of the second wireless node comprises a MAC address of the second wireless node.

17. The method of claim 12, wherein determining whether the encoded address identifies the first wireless node and the second wireless node as the same destination is based on at least one frame obtained pursuant to an association with the second wireless node.

18. The method of claim 12, wherein the indication comprises an instruction to use a second parameter, wherein the second parameter is different from the at least one first parameter.

19. The method of claim 12, wherein determining whether the encoded address identifies the first wireless node and the second wireless node as the same destination comprises:
generating the encoded address based on the at least one first parameter and an address of the first wireless node;
generating a second encoded address based on the at least one first parameter and an address of the second wireless node; and
determining whether the second encoded address is the same as the encoded address.

20. A wireless node, comprising:
a processing system configured to:
determine whether an encoded address, generated using at least one first parameter, identifies a first wireless node and a second wireless node as a same destination for at least one first frame including the encoded address, and
generate at least one second frame including an indication not to use the at least one first parameter if the encoded address identifies the first wireless node and the second wireless node as the same destination; and
a transmitter configured to transmit the at least one second frame to at least one of the first wireless node or the second wireless node.

* * * * *